US011058985B2

United States Patent
Xing et al.

(10) Patent No.: US 11,058,985 B2
(45) Date of Patent: Jul. 13, 2021

(54) METHODS FOR GAS SEPARATION

(71) Applicants: UNIVERSITY OF LIMERICK, Limerick (IE); UNIVERSITY OF TEXAS AT SAN ANTONIO, San Antonio, TX (US); ZHEJIANG UNIVERSITY, Hangzhou (CN)

(72) Inventors: Huabin Xing, Hangzhou (CN); Xili Cui, Hangzhou (CN); Michael Zaworotko, Limerick (IE); Kai Jie Chen, Limerick (IE); Banglin Chen, San Antonio, TX (US)

(73) Assignees: UNIVERSITY OF LIMERICK, Limerick (IE); UNIVERSITY OF TEXAS AT SAN ANTONIO, San Antonio, TX (US); ZHEJIANG UNIVERSITY, Zhejiang (CN)

( * ) Notice: Subject to any disclaimer, the term of this patent is extended or adjusted under 35 U.S.C. 154(b) by 106 days.

(21) Appl. No.: 16/074,903

(22) PCT Filed: Feb. 2, 2016

(86) PCT No.: PCT/CN2016/073137
§ 371 (c)(1),
(2) Date: Aug. 2, 2018

(87) PCT Pub. No.: WO2017/132816
PCT Pub. Date: Aug. 10, 2017

(65) Prior Publication Data
US 2019/0054413 A1    Feb. 21, 2019

(51) Int. Cl.
*B01D 53/04* (2006.01)
*B01J 20/22* (2006.01)
(Continued)

(52) U.S. Cl.
CPC ............ *B01D 53/04* (2013.01); *B01D 53/02* (2013.01); *B01J 20/226* (2013.01);
(Continued)

(58) Field of Classification Search
CPC .. B01D 53/02; B01D 53/04; B01D 2257/022; B01D 2257/702; B01D 2257/7022; B01D 2253/204; B01J 20/226; B01J 20/2808
See application file for complete search history.

(56) References Cited

U.S. PATENT DOCUMENTS

2011/0172412 A1* 7/2011 Serre .................... C07C 7/13
540/145

FOREIGN PATENT DOCUMENTS

| CN | 102962037 A | 3/2013 |
| CN | 104368310 A | 2/2015 |

(Continued)

OTHER PUBLICATIONS

Hu, T. L. et al. (2015). Microporous metal-organic framework with dual functionalities for highly efficient removal of acetylene from ethylene/acetylene mixtures. Nature communications, 6(1), 1-9. (Year: 2015).*

(Continued)

*Primary Examiner* — Jonathan Miller
*Assistant Examiner* — Gabriel E Gitman
(74) *Attorney, Agent, or Firm* — Hoffman Warnick LLC

(57) ABSTRACT

A method of separating acetylene from a gas mixture comprising acetylene is provided. The method involves the use of a hybrid porous material with an affinity for acetylene adsorption. The hybrid porous material comprises a three-dimensional structure of metal species (M) and first and second linker groups ($L^1$ and $L^2$), wherein the metal species (M) are linked together in a first and second direction by first linker groups ($L^1$) and are linked together in a third direction
(Continued)

Figure 1A:
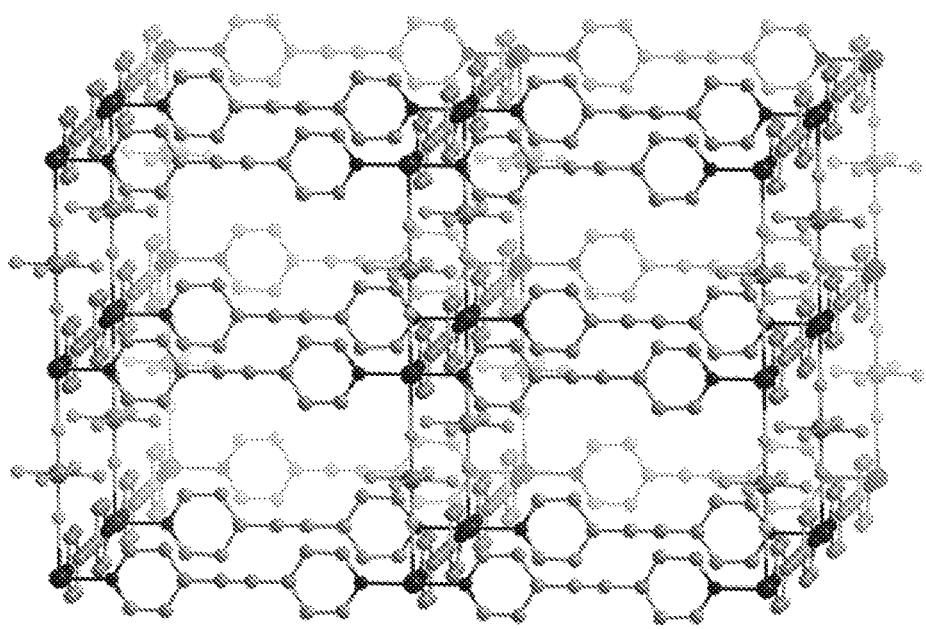

by second linker groups ($L^2$) to form the three-dimensional structure. The hybrid porous materials may have a high selectivity for acetylene and/or a high capacity for acetylene adsorption. The method may be particularly useful for the purification of ethylene gas contaminated with acetylene during an ethylene production/purification process. The method may be particularly useful for the large scale separation of acetylene from other gases such as ethylene and carbon dioxide, during an acetylene production/purification process.

15 Claims, 29 Drawing Sheets

(51) Int. Cl.
 *B01J 20/28* (2006.01)
 *B01D 53/02* (2006.01)
(52) U.S. Cl.
 CPC ..... *B01J 20/2808* (2013.01); *B01D 2253/204* (2013.01); *B01D 2257/702* (2013.01); *B01D 2257/7022* (2013.01)

(56) References Cited

FOREIGN PATENT DOCUMENTS

| SA | WO2016014963 | A1 | * | 1/2016 | ............. B01D 53/22 |
| WO | WO2014074679 | A1 | * | 5/2014 | ............. B01D 53/02 |
| WO | 2015195791 | A1 |   | 12/2015 |  |
| WO | 2016014963 | A1 |   | 1/2016 |  |

OTHER PUBLICATIONS

International Search Report and Written Opinion for International Application No. PCT/CN2016/073137, dated Nov. 7, 2016, 11 pages.
Kitagawa, "Porous Materials and the Age of the Gas," Angewandte Editorial, Angew. Chem. Int. Ed. 2015, 64, 10686-10687.
Bloch et al., "Hydrocarbon Separations in a Metal-Organic Framework with Open Iron(II) Coordination Sites," Science, 2012, 335, 1606-1610.
Das et al., "Interplay of Metalloligand and Organic Ligand to Tune Micropores within Isostructural Mixed-Metal Organic Frameworks (M'MOFs) for Their Highly Selective Separation of Chiral and Achiral Small Molecules," Journal of the American Chemical Society, 2012, 134, 8703-8710.
Zhang et al. "Temperature and Concentration Control over Interpenetration in a Metal-Organic Material," Journal of the American Chemical Society, 2009, 131, 17040-17041.
Zhang et al., "Template-directed synthesis of metal-organic materials," Chem Soc Rev, , 2014, 43, 5444-5455.
Burd et al., "Highly Selective Carbon Dioxide Uptake by [Cu(bpy-n)2(SiF6)] {bpy-1=4,4'-Bipyridine; bpy-2=1,2-Bis(4-pyridyl)ethene)," Journal of the American Chemical Society 134:3663-3666 (2012).
Zhang et al., "Triple Framework Interpenetration and Immobilization of Open Metal Sites within a Microporous Mixed Metal—Organic Framework for Highly Selective Gas Adsorption," Inorganic Chemistry 51:4947-4953 (2012).

* cited by examiner

METHODS FOR GAS SEPARATION

The present invention relates to a method of separating acetylene from a gas mixture comprising acetylene. In particular the invention relates to separating acetylene from a gas mixture comprising acetylene and ethylene and/or a gas mixture comprising acetylene and carbon dioxide and/or a gas mixture comprising acetylene, ethylene and carbon dioxide. The present invention also relates to the use of a hybrid porous material for separating acetylene from a gas mixture comprising acetylene.

Gases are important industrial commodities and fuels, and their importance is increasing as described in "Porous Materials and the Age of the Gas" (Kitagawa, S., Angew. Chem. Int. Ed. 2015, 54, 10686-10687). However, the purification, separation, sequestration, storage and sensing of various important gases presents many technical challenges. For example, ethylene is an important feedstock chemical in polymer production but purifying ethylene, in particular by removing acetylene, to a desired high purity in an efficient manner has proved to be difficult.

Known methods of separating/purifying acetylene and ethylene, such as solvent extraction, distillation and partial hydrogenation of acetylene, involve high energy consumption and costly processes. Therefore, there is a need to develop efficient methods for the selective separation of acetylene and ethylene. There is also a need to develop efficient methods for the selective separation of acetylene from ethylene and other gases which may be present in a gas mixture during the production of acetylene, such as other hydrocarbons (besides acetylene and ethylene) and carbon dioxide.

There has been a large amount of research into methods of separating/purifying gas mixtures using porous materials focussing on zeolites, metal-organic frameworks (MOFs) and covalent-organic frameworks (COFs). However many known methods involve a trade-off between physical adsorption capacity (known as the working capacity) and selectivity for the target gas, with highly selective materials giving a poor adsorption capacity and materials with high adsorption capacity giving poor selectivity.

For example the MOFs described in "Hydrocarbon Separations in a Metal-Organic Framework with Open Iron(II) Coordination Sites" (E. D. Bloch et al, Science, 2012, 335, 1606-1610) can adsorb a relatively high amount of acetylene gas but give a relatively poor separation selectivity.

The MOFs described in "Interplay of Metalloligand and Organic Ligand to Tune Micropores within Isostructural Mixed-Metal Organic Frameworks (M'MOFs) for Their Highly Selective Separation of Chiral and Achiral Small Molecules" (M. C. Das et al, J. Am. Chem. Soc., 2012, 134, 8703-8710), have a relatively high selectivity for acetylene but only adsorb low amounts of the gas.

The inability to achieve both high capacity and high selectivity has presented a major barrier to the development of efficient gas separation techniques using MOFs.

It is an aim of the present invention to provide a method, use or material that addresses at least one disadvantage of the prior art, whether identified here or elsewhere, or to provide an alternative to existing methods, uses or materials. For instance it is an aim of embodiments of the present invention to provide a method of separating acetylene from a gas mixture comprising acetylene, the method having a high selectivity for acetylene and/or a high capacity for acetylene adsorption. It may be a further aim of embodiments of the present invention to provide such a method which can be performed at around ambient temperature and/or pressure.

According to a first aspect of the present invention, there is provided a method of separating acetylene from a gas mixture comprising acetylene, the method comprising contacting the gas mixture with a hybrid porous material; wherein the hybrid porous material comprises a three-dimensional lattice of metal species (M) and linker groups; wherein the metal species (M) are linked together in a first and second dimension by first linker groups ($L^1$) and are linked together in a third dimension by second linker groups ($L^2$) to form the three-dimensional lattice; and wherein one of $L^1$ and $L^2$ is an organic linker group and the other of $L^1$ and $L^2$ is an inorganic linker group.

Suitably the hybrid porous material has the chemical formula: $M(L^1)_2(L^2)$.

Suitably the metal species (M) are transition metal atoms or ions.

Suitably the metal species (M) are first row transition metal atoms or ions.

Suitably the metal species (M) are selected from atoms or ions of Cu, Zn and Ni.

In some preferred embodiments the metal species (M) are Cu ions. Preferably the metal species (M) are $Cu^{2+}$ ions.

In some preferred embodiments the metal species (M) are Ni ions. Preferably the metal species (M) are $Ni^{2+}$ ions.

Suitably all metal species (M) in the hybrid porous material are the same.

Alternatively, the metal species (M) in the hybrid porous material may comprise at least two different metal species (M), suitably selected from atoms or ions of Cu, Zn and Ni.

In the hybrid porous material used in the method of the first aspect of the present invention, the metal species (M) are linked together in a first and second dimension by first linker groups ($L^1$).

One of $L^1$ and $L^2$ is an organic linker group and the other of $L^1$ and $L^2$ is an inorganic linker group. In other words either the first linker groups ($L^1$) are organic linkers and the second linker groups ($L^2$) are inorganic linkers or the first linker groups ($L^1$) are inorganic linkers and the second linker groups ($L^2$) are organic linkers.

Therefore the first linker groups ($L^1$) may be organic linkers or inorganic linkers. Suitably the first linker groups ($L^1$) are organic linkers. Preferably the first linker groups ($L^1$) comprise at least two donor atoms. Donor atoms are atoms present within the linker group which have a lone electron pair which can be donated, for example in the formation of a metal-ligand complex. This lone electron pair is suitably donated to the metal species on formation of the hybrid porous material. The donor atoms may be charged or neutral species, for example a donor atom may in fact be present as an ion such as $O^-$.

Suitably the donor atoms in the organic linkers are selected from halogens, oxygen and nitrogen. A suitable organic linker may comprise N-oxide groups which provide an oxygen donor atom. The two or more donor atoms may each be the same or different.

Suitably the donor atoms are selected from oxygen and nitrogen.

Preferably all the donor atoms are nitrogen.

Suitably the first linker groups ($L^1$) are nitrogen ligands comprising at least two donor atoms which are nitrogen atoms. Suitably the at least two nitrogen atoms each comprise a lone pair of electrons suitable for binding to a metal species. Therefore the nitrogen ligands are suitably two-connected nitrogen ligands. By "two-connected" we mean the nitrogen ligand is capable of binding to two different metal species (M) in the hybrid porous material. In preferred embodiments the lone pairs of electrons on the two nitrogen atoms are in orbitals orientated away from each other at an angle capable of forming a lattice, for example an angle greater than 90°, for example an angle of approximately 120° or an angle of approximately 180°.

Suitably the two nitrogen atoms in the two-connected nitrogen ligands are separated by from 2.5 to 20 Å, for example separated by from 2.5 to 10 Å or from 10 to 20 Å.

Suitably the first linker groups ($L^1$) are two-connected nitrogen ligands. Preferred two-connected nitrogen ligands comprise at least one nitrogen-containing heterocycle. In some embodiments the two-connected nitrogen ligand may be a nitrogen-containing heterocycle comprising two nitrogen atoms each having a lone pair of electrons, for example pyrazine.

In some embodiments the two-connected nitrogen ligand comprises two nitrogen-containing heterocycles. The two nitrogen-containing heterocycles may be linked together by a bond. One such preferred two-connected nitrogen ligand is 4,4'-bipyridine.

Alternatively, the two nitrogen-containing heterocycles may be linked together by a spacer group, for example acetylene. One such preferred two-connected nitrogen ligand is 4,4'-bipyridylacetylene. Suitably the first linker groups ($L^1$) are two-connected nitrogen ligands having the formula (L2N):

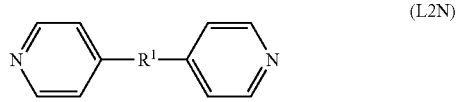

(L2N)

wherein $R^1$ is an optionally substituted linker group.

$R^1$ may be a heteroatom, a group of connected heteroatoms or a group comprising heteroatoms. For example $R^1$ may be a —N=N— group.

$R^1$ may be a hydrocarbyl group. The hydrocarbyl group may comprise a cyclic group. The hydrocarbyl group may comprise an aromatic cyclic group. The hydrocarbyl group may comprise a heterocyclic group.

As used herein, the term "hydrocarbyl" is used in its ordinary sense, which is well-known to those skilled in the art. Specifically, it refers to a group having predominantly hydrocarbon character. Examples of hydrocarbyl groups include:
(i) hydrocarbon groups, that is, aliphatic (which may be saturated or unsaturated, linear or branched, e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);
(ii) substituted hydrocarbon groups, that is, substituents containing non-hydrocarbon groups which, in the context of this invention, do not alter the predominantly hydrocarbon nature of the substituent (e.g., halo (especially chloro and fluoro), hydroxy, alkoxy, keto, acyl, cyano, mercapto, alkylmercapto, amino, alkylamino, nitro, nitroso, and sulphoxy);
(iii) hetero substituents, that is, substituents which, while having a predominantly hydrocarbon character, in the context of this invention, contain other than carbon in a ring or chain otherwise composed of carbon atoms. Heteroatoms include sulphur, oxygen, nitrogen, and encompass substituents as pyridyl, furyl, thienyl and imidazolyl.

Suitable two-connected nitrogen ligands may be selected from 4,4'-bipyridylacetylene and compounds (LA) to (LI):

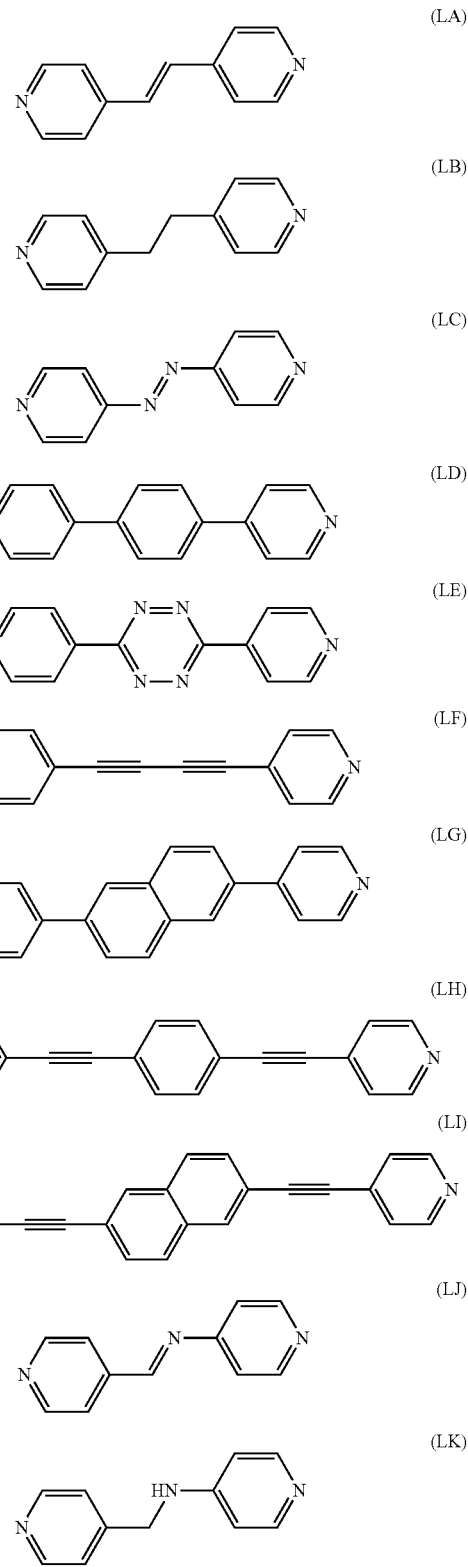

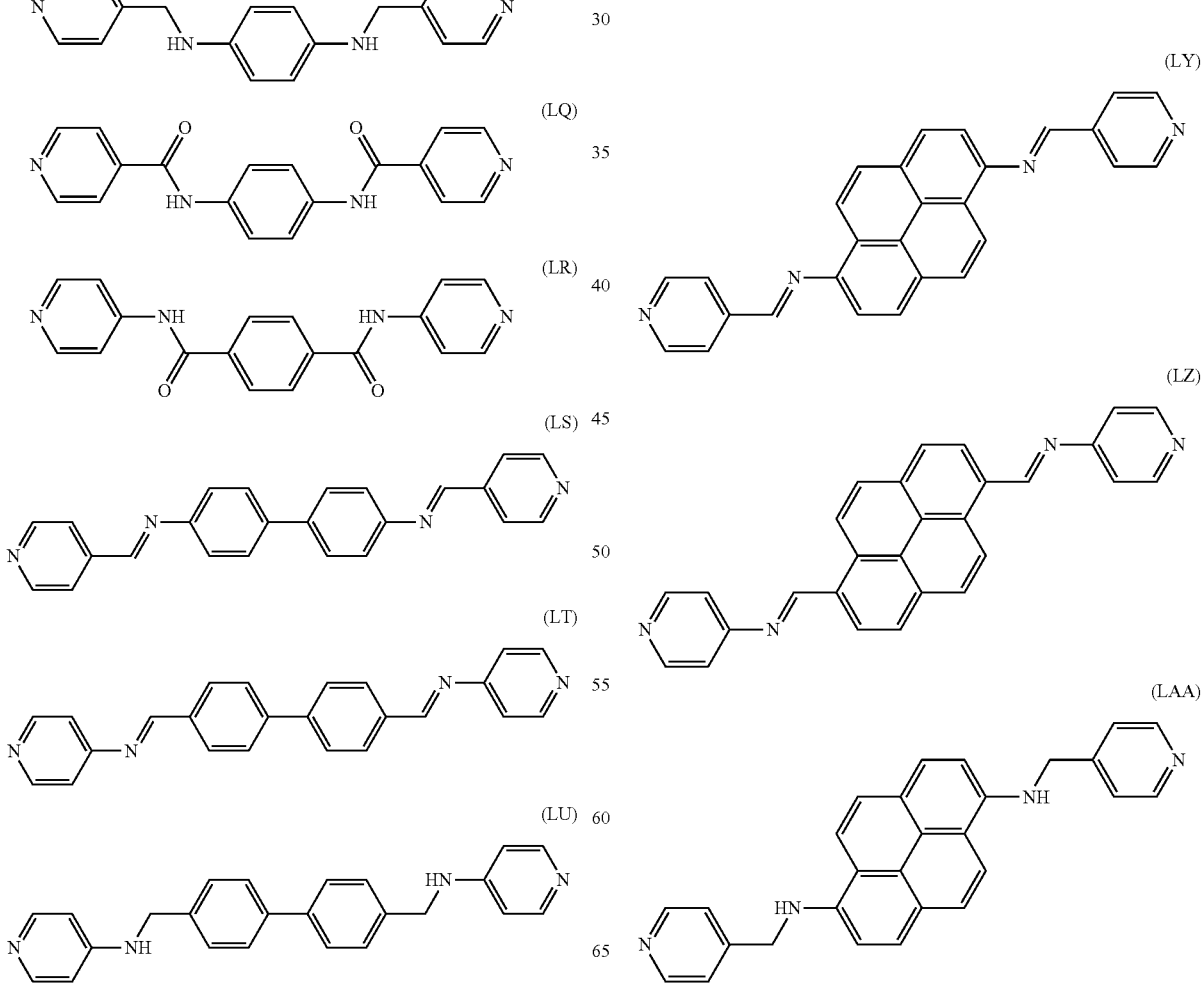

-continued

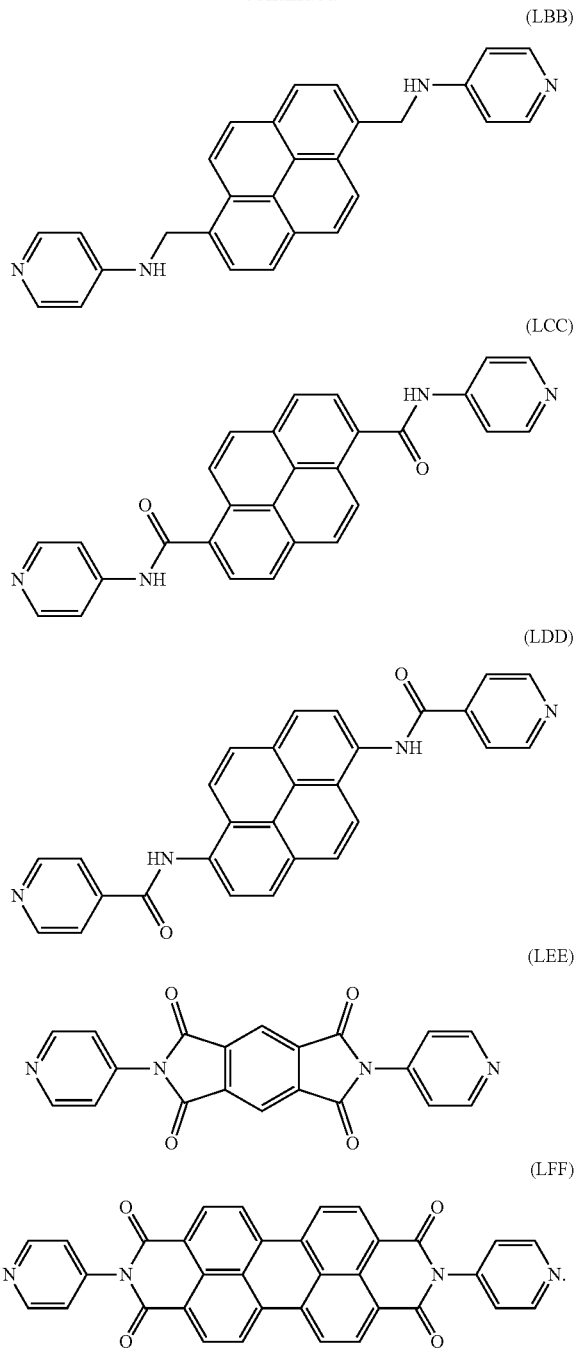

Suitably the first linker groups (L¹) are two-connected nitrogen ligands selected from pyrazine, 4,4'-bipyridine and 4,4'-bipyridylacetylene. Preferably the first linker groups (L¹) are selected from 4,4'-bipyridylacetylene and 4,4'-bipyridine.

Suitably all first linker groups (L¹) in the hybrid porous material are the same.

Figure 29:
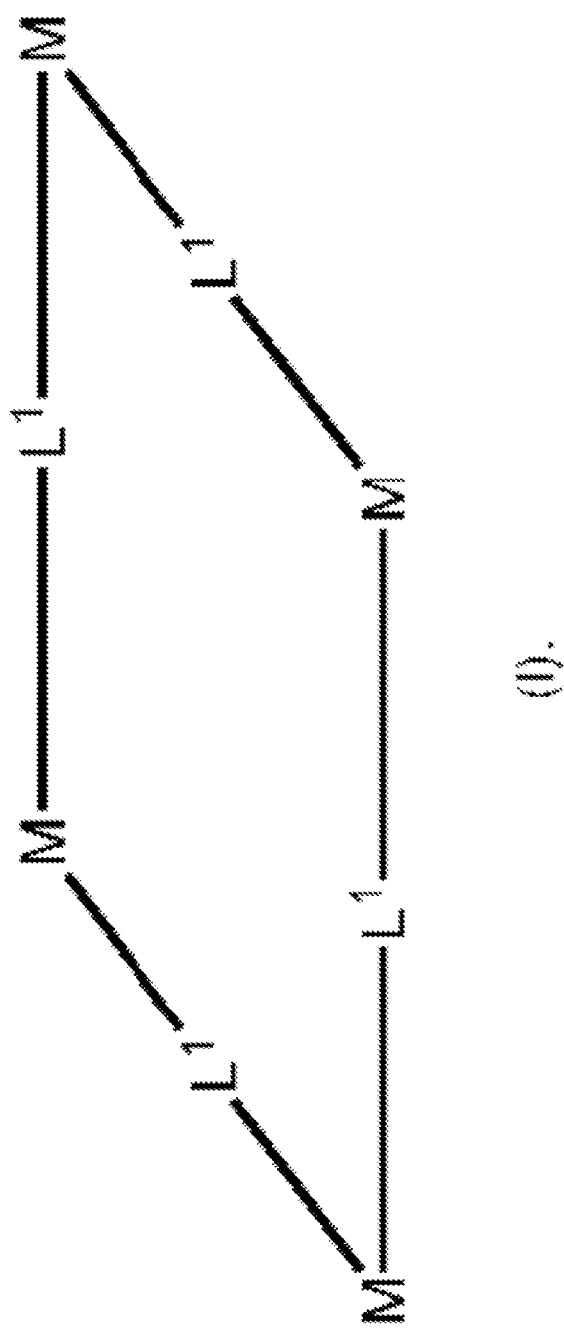

The metal species (M) are linked together in a first and second dimension by the first linker groups (L¹). Suitably the first and second dimensions are substantially perpendicular to one another. Suitably the first linker groups (L¹) link together the metal species (M) to form a two-dimensional layer having a square planar repeating unit of formula (I), illustrated in FIG. 29.

In the hybrid porous material used in the method of this first aspect, the metal species (M) are linked together in a third dimension by second linker groups (L²) to form a three-dimensional lattice.

Suitably the second linker groups (L²) are capable of forming an interaction between two different metal species. Typically the metal species form a two-dimensional layer with first linker groups (L¹), for example a two-dimensional layer of square planar repeating units, for example of formula (I).

Suitably the second linker groups (L²) form an interaction with two different metal species in two different layers.

Suitably the second linker groups (L²) are capable of forming interactions with two different atoms or ions of metal species (M) in order to form a three-dimensional lattice.

For example the second linker groups (L²) are capable of forming interactions with two different atoms or ions of metal species (M) which are orientated at an angle to each other of greater than 90°, for example an angle of approximately 120° or an angle of approximately 180°.

Preferably the second linker groups (L²) are inorganic linkers.

Suitably each second linker group (L²) includes at least two donor atoms. Suitable donor atoms include halogens, oxygen, nitrogen and sulphur. Preferred donor atoms of the second linker groups (L²) are halogens, especially chlorine or fluorine, preferably fluorine.

Suitably the second linker groups (L²) comprise at least one halogen atom. Preferably the second linker groups (L²) comprise at least one fluorine atom.

Suitably the second linker groups (L²) are inorganic compounds comprising at least one fluorine atom. Suitably the second linker groups (L²) are charged, suitably anions. Suitably the second linker groups (L²) are inorganic anions comprising at least one fluorine atom.

Preferably the second linker groups (L²) comprise at least two halogen atoms. Preferably the second linker groups (L²) comprise at least two fluorine atoms.

Suitably the second linker groups (L²) are compounds of formula $AX_n^{y-}$, wherein X is selected from F or Cl, n is an integer from 2 to 6, y is an integer from 0 to 2 and A is selected from Si, Ti, Sn, Zr or Ge. Suitably n is an integer from 4 to 6. Preferably n is 6. Preferably y is 2. Preferably X is F.

Preferably the second linker groups (L²) are selected from $SiF_6^{2-}$, $TiF_6^{2-}$, $SnF_6^{2-}$, $ZrF_6^{2-}$ and $GeF_6^{2-}$.

Preferably the second linker groups (L²) are selected from $SiF_6^{2-}$, $TiF_6^{2-}$ and $SnF_6^{2-}$.

Preferably the second linker groups (L²) are ions of $SiF_6^{2-}$.

Preferably the second linker groups (L²) are ions of $TiF_6^{2-}$.

Preferably the second linker groups (L²) are ions of $SnF_6^{2-}$.

Preferably the second linker groups (L²) are ions of $ZrF_6^{2-}$.

Preferably the second linker groups (L²) are ions of $GeF_6^{2-}$.

Suitably all second linker groups (L²) in the hybrid porous material are the same.

Suitably the second linker groups (L²) link the metal species (M) of different two dimensional layers having a square planar repeating unit of formula (I) to form the three-dimensional lattice.

Suitably the three-dimensional lattice of metal species (M) and linker groups has a cubic lattice structure, suitably a primitive cubic lattice structure.

Figure 30:
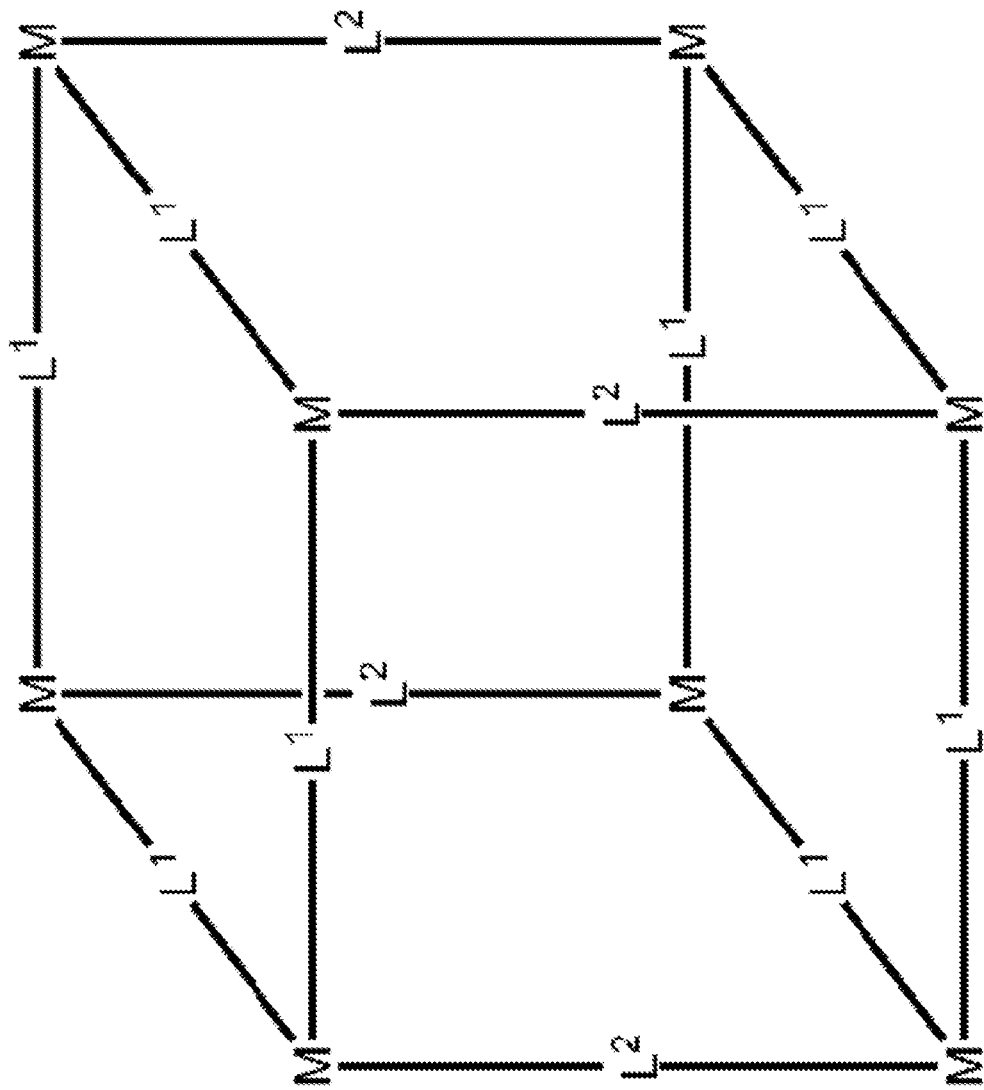

Suitably the three-dimensional lattice of metal species (M) and linker groups ($L^1$ and $L^2$) comprises the repeating unit (unit cell) of formula (II), illustrated in FIG. 30.

Suitably the three-dimensional lattice of metal species (M) and linker groups consists essentially of repeating units of formula (II).

Suitably the metal species (M) are selected from $Cu^{2+}$, $Ni^{2+}$ and $Zn^{2+}$ ions, the first linker groups ($L^1$) are selected from 4,4'-bipyridylacetylene, 4,4'-bipyridine and pyrazine and the second liker groups ($L^2$) are selected from $SiF_6^{2-}$, $TiF_6^{2-}$, $SnF_6^{2-}$, $ZrF_6^{2-}$ and $GeF_6^{2-}$.

Preferably the metal species (M) are selected from $Cu^{2+}$, $Ni^{2+}$ and $Zn^{2+}$ ions, the first linker groups ($L^1$) are selected from 4,4'-bipyridylacetylene, 4,4'-bipyridine and pyrazine and the second liker groups ($L^2$) are selected from $SiF_6^{2-}$, $TiF_6^{2-}$ and $SnF_6^{2-}$ ions.

Suitably the metal species (M) are $Cu^{2+}$ ions, the first linker groups ($L^1$) are selected from 4,4'-bipyridylacetylene and 4,4'-bipyridine and the second liker groups ($L^2$) are $SiF_6^2$ ions.

The hybrid porous material used in the method of this first aspect may be prepared by any suitable method, for example by solid state synthesis, crystallisation from a suitable solvent, direct mixing or mechanochemistry, each with or without heating. For example, the hybrid porous material may be prepared by any of the above methods by reacting an approximately equimolar amount of the metal species (M), for example a salt of the metal species (M), the first linker group ($L^1$), for example a two-connected nitrogen ligand, and the second linker group ($L^2$), for example a salt of an $AX_n^{y-}$ anion, optionally together in a suitable solvent, for example a mixture of water and methanol, optionally with heating.

Figure 31:
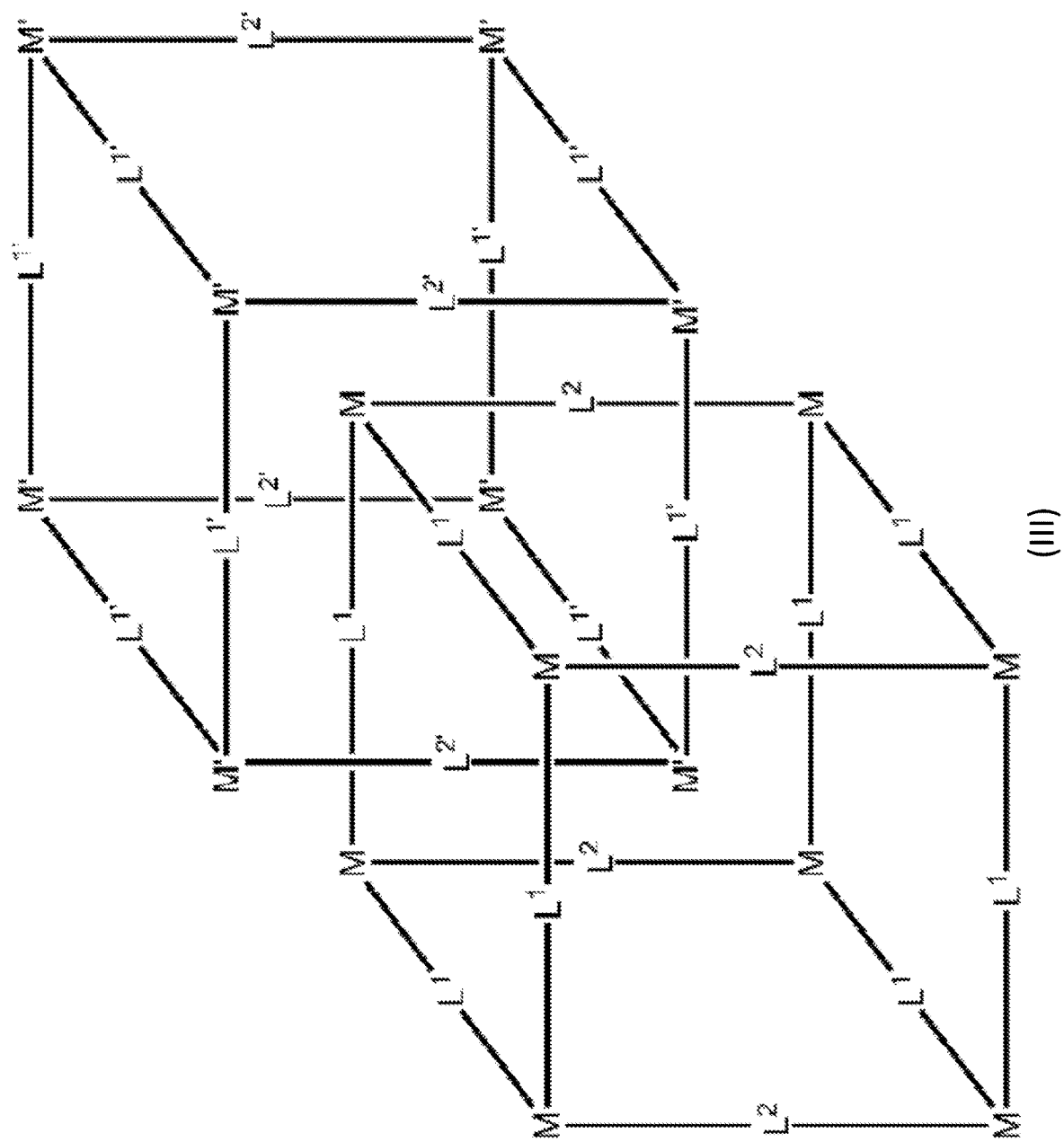

In some embodiments, the three-dimensional lattice of metal species (M) and linker groups ($L^1$ and $L^2$) may be interpenetrated. By interpenetrated we mean that two or more three-dimensional lattices of metal species (M) and linker groups have become interlocked so that they cannot be separated without breaking chemical bonds, for example as shown in structure (III) illustrated in FIG. 31. As shown in structure (III) in FIG. 31, the first three-dimensional lattice comprises M, $L^1$ and $L^2$ and the second three-dimensional lattice comprises M', $L^{1'}$ and $L^{2'}$.

Whether a hybrid porous material forming reaction, such as those described above, forms an interpenetrated hybrid porous material or a non-interpenetrated hybrid porous material may depend on the particular reaction type and/or the solvent used (if any) and/or the temperature of the reaction and/or the concentration of the reaction mixture, as described in "Temperature and Concentration Control over Interpenetration in a Metal-Organic Material" (Zaworotko, M. J. et al, J. Am. Chem. Soc., 2009, 131, 17040-17041) and "Template-directed synthesis of metal-organic materials" (Zaworotko, M. J. and Zhang, Z., Chem. Soc. Rev., 2014, 43, 5444).

The three-dimensional lattice of metal species (M) and linker groups, which provides the hybrid porous material used in the method of this first aspect, comprises pores. The pores are formed in the sections of the three-dimensional lattice defined by M, $L^1$ and $L^2$. Therefore in the method, acetylene may pass through openings of the pores in the hybrid porous material defined by M, $L^1$ and $L^2$ and become bound to the three-dimensional lattice within said pores. It is believed that the size of said pores may contribute to the selectivity and capacity exhibited by the hybrid porous materials of the present invention.

Suitably the hybrid porous material comprises pores with an effective pore size of from 3.5 to 12 Å.

Effective pore size may be additionally or alternatively defined as the effective pore diameter. Effective pore size/diameter is a measure of the dimensions of the pore at the narrowest point of the pore. These values take into account the van der Waals radii of the atoms lining the pore wall (i.e. they are not atom to atom distances).

In alternative embodiments the first linker groups ($L^1$) are inorganic linkers and are as defined above in relation to the second linker groups ($L^2$), and the second linker groups ($L^2$) are organic linkers and are as defined above in relation to the first linker groups ($L^1$). In other words, in the hybrid porous material used in the method of the first aspect, the above definitions of the first linker groups ($L^1$) and the second linker groups ($L^2$) may be interchanged.

In one preferred embodiment of the method of this first aspect, the metal species (M) are $Cu^{2+}$ ions, the first linker groups ($L^1$) are 4,4'-bipyridylacetylene, the second liker groups ($L^2$) are $SiF_6^{2-}$ ions and the three-dimensional lattice of metal species (M) and linker groups is interpenetrated. This particular hybrid porous material may be known as SIFSIX-2-Cu-i.

In one preferred embodiment of the method of this first aspect, the metal species (M) are $Cu^{2+}$ ions, the first linker groups ($L^1$) are 4,4'-bipyridylacetylene, the second liker groups ($L^2$) are $TiF_6^{2-}$ ions and the three-dimensional lattice of metal species (M) and linker groups is interpenetrated. This particular hybrid porous material may be known as TIFSIX-2-Cu-i.

In one preferred embodiment of the method of this first aspect, the metal species (M) are $Cu^{2+}$ ions, the first linker groups ($L^1$) are 4,4'-bipyridylacetylene, the second liker groups ($L^2$) are $SnF_6^{2-}$ ions and the three-dimensional lattice of metal species (M) and linker groups is interpenetrated. This particular hybrid porous material may be known as SNFSIX-2-Cu-i.

In one preferred embodiment of the method of this first aspect, the metal species (M) are $Ni^{2+}$ ions, the first linker groups ($L^1$) are pyrazine, the second liker groups ($L^2$) are $SiF_6^{2-}$ ions and the three-dimensional lattice of metal species (M) and linker groups is not interpenetrated. This particular hybrid porous material may be known as SIFSIX-3-Ni.

In one preferred embodiment of the method of this first aspect, the metal species (M) are $Cu^{2+}$ ions, the first linker groups ($L^1$) are 4,4'-bipyridine, the second liker groups ($L^2$) are $SiF_6^{2-}$ ions and the three-dimensional lattice of metal species (M) and linker groups is not interpenetrated. This particular hybrid porous material may be known as SIFSIX-1-Cu.

In one preferred embodiment of the method of this first aspect, the metal species (M) are $Cu^{2+}$ ions, the first linker groups ($L^1$) are 4,4'-bipyridylacetylene, the second liker groups ($L^2$) are $SiF_6^{2-}$ ions and the three-dimensional lattice of metal species (M) and linker groups is not interpenetrated. This particular hybrid porous material may be known as SIFSIX-2-Cu.

In one preferred embodiment of the method of this first aspect, the metal species (M) are $Zn^{2+}$ ions, the first linker groups ($L^1$) are pyrazine, the second liker groups ($L^2$) are $SiF_6^{2-}$ ions and the three-dimensional lattice of metal species (M) and linker groups is not interpenetrated. This particular hybrid porous material may be known as SIFSIX-3-Zn.

Without being bound theory, it is believed that the hybrid porous materials used in the method of the present invention can act as effective acetylene traps due to the materials having a pore size (effective pore size) and pore chemistry which is complimentary to acetylene and which favours acetylene adsorption. Such materials may provide excellent acetylene selectivity and capacity.

In preferred embodiments the hybrid porous materials used in the method of the present invention comprise second linker groups ($L^2$) which are inorganic compounds comprising at least one fluorine atom. Without being bound theory, it is believed that acetylene molecules are adsorbed primarily through strong C—H . . . F hydrogen bonding, for example between acetylene and $SiF_6^{2-}$ (2.017 Å bond length). It is believed that another important interaction which enables the hybrid porous material to adsorb acetylene is the van der Waals interaction between acetylene and the first linker groups ($L^1$), for example 4,4'-bipyridine. For example each crystal unit cell of SIFSIX-1-Cu contains four equivalent exposed F atoms with lone pair of electrons at the same horizontal plane, and its channel pore dimension is large enough for each exposed F atom to bind one acetylene molecule. Furthermore, the distance between neighbouring adsorbed $C_2H_2$ is ideal for the acetylene molecules to interact with each other through multiple H$\delta$+ . . . C$\delta$- dipole-dipole interactions (which may be termed guest-guest interactions) and further enhance adsorption in this material.

In embodiments wherein the second linker groups ($L^2$) are $SiF_6^{2-}$, the weakly basic $SiF_6^{2-}$ (pKa=1.92) sites are believed to primarily initiate the binding of acetylene molecules. Acetylene is more acidic (pKa=25) than ethylene (pKa=44) and therefore $SiF_6^{2-}$ forms stronger interactions with acetylene than ethylene (for example $\Delta E$ in SIFSIX-1-Cu: 44.6 kJ/mol for acetylene versus 27.2 kJ/mol for ethylene). This is believed to contribute to the selectivity for acetylene over ethylene in the methods of this first aspect. The same reasoning can be applied to alternative second linker groups ($L^2$) which are also weakly basic, such as $TiF_6^{2-}$, $SnF_6^{2-}$, $ZrF_6^{2-}$ and $GeF_6^{2-}$.

The method of this first aspect involves separating acetylene from a gas mixture comprising acetylene. Suitably the separation of acetylene from the gas mixture comprising acetylene involves absorption of the acetylene onto a surface of the hybrid porous material. Suitably the acetylene is absorbed onto an inner surface, suitably an inner surface of the pores of the hybrid porous material.

Suitably the acetylene adsorbed onto the surface of the hybrid porous material may then be later desorbed from the hybrid porous material and therefore be obtained in a higher purity than was present in the gas mixture comprising acetylene.

Suitable methods of desorption are known in the art and may include using reduced pressure (vacuum desorption), using heated carrier gases such as nitrogen or hydrogen and using heat (above ambient but below 120° C.).

The method of this first aspect may involve the use of the hybrid porous material in a fixed bed purification/separation process, wherein the hybrid porous material provides a fixed bed filtration media.

The method of this first aspect may involve the use of the hybrid porous material as part of a purification/separation membrane.

Suitably the gas mixture comprises ethylene. Suitably the gas mixture comprises acetylene and ethylene. Suitably the gas mixture consists essentially of acetylene and ethylene.

The gas mixture may be wet or dry. In other words, the gas mixture may comprise water vapour or may be substantially free of water vapour.

In some embodiments the method may operate to purify ethylene gas which is contaminated with acetylene and therefore may remove relatively small quantities of acetylene from the contaminated ethylene gas. In such embodiments the gas mixture may be a contaminated ethylene.

In such embodiments the hybrid porous may be SIFSIX-2-Cu-i (i.e. wherein the metal species (M) are $Cu^{2+}$ ions, the first linker groups ($L^1$) are 4,4'-bipyridylacetylene, the second linker groups ($L^2$) are $SiF_6^{2-}$ ions and the three-dimensional lattice of metal species (M) and linker groups is interpenetrated). The inventors have found that SIFSIX-2-Cu-i is particularly effective in such a method.

In such embodiments, the contaminated ethylene may comprise from 0.001 to 5 wt % acetylene, preferably from 0.01 to 4 wt %, preferably from 0.05 to 3 wt % suitably from 0.1 to 2 wt %, for example from 0.5 to 1.5 wt %.

In such embodiments, the gas mixture may comprise a ratio of acetylene:ethylene of from 0.1:99.9 to 10:90, for example from 1:99 to 5:95.

In such embodiments, the contaminated ethylene may comprise other low molecular weight hydrocarbons, for example methane, ethane, propylene and propane.

In some embodiments the method may operate to provide a mass (for example a large scale) separation of acetylene from ethylene in order to provide relatively large quantities of acetylene in high purity.

In such embodiments the hybrid porous may be SIFSIX-1-Cu (i.e. wherein the metal species (M) are $Cu^{2+}$ ions, the first linker groups ($L^1$) are 4,4'-bipyridine, the second liker groups ($L^2$) are $SiF_6^{2-}$ ions and the three-dimensional lattice of metal species (M) and linker groups is not interpenetrated). The inventors have found that SIFSIX-1-Cu is particularly effective in such a method.

In such embodiments the gas mixture may comprise from a ratio of acetylene:ethylene of from 1:9 to 9:1, suitably of from 1:4 to 4:1, suitably from 3:7 to 7:3, for example from 4:6 to 6:4.

In such embodiments, the gas mixture may comprise a ratio of acetylene:ethylene of from 4:6 to 9:1.

In such embodiments acetylene and ethylene may in combination provide up to 90 vol % of the gas mixture, suitably up to 80 vol %, for example up to 70 vol %.

In such embodiments the gas mixture may comprise other components, for example paraffins, carbon dioxide, carbon monoxide, other alkynes (besides acetylene), other alkenes (besides ethylene) and dienes.

The contacting of the gas mixture with the hybrid porous material may be carried out at any suitable temperature below 120° C., at which temperature the risk of acetylene exploding is very high.

Suitably the method of this first aspect may be carried out at ambient temperature. The method being able to function effectively at ambient temperature leads to cost and/or energy savings and represents a significant advantage over some methods of the prior art.

Suitably the contacting of the gas mixture with the hybrid porous material is carried out at a temperature of from −20° C. to 60° C., suitably of from 0° C. to 50° C., suitably from 10° C. to 40° C.

In some embodiments, the contacting of the gas mixture with the hybrid porous material is carried out at a pressure of from 0.5 to 2 bar.

In some alternative embodiments, the contacting of the gas mixture with the hybrid porous material is carried out at a partial pressure of acetylene below 0.1 bar.

Suitably the method of this first aspect is carried out under ambient pressure. The method being able to function effectively at ambient pressure leads to cost and/or energy savings and avoids the use of complex equipment thus providing significant advantages over some methods of the prior art.

According to a second aspect of the present invention, there is provided the use of a hybrid porous material for separating acetylene from a gas mixture comprising acetylene;
wherein the hybrid porous material comprises a three-dimensional lattice of metal species (M) and linker groups;
wherein the metal species (M) are linked together in a first and second dimension by first linker groups ($L^1$) and are linked together in a third dimension by second linker groups ($L^2$) to form the three-dimensional lattice; and
wherein one of $L^1$ and $L^2$ is an organic linker group and the other of $L^1$ and $L^2$ is an inorganic linker group.

Preferred features of the second aspect are as defined in relation to the first aspect.

The use of this second aspect may be to purify ethylene gas contaminated with acetylene, for example during an ethylene production/purification process. In such a use the hybrid porous material may be SIFSIX-2-Cu-i.

The use of this second aspect may be to separate acetylene from ethylene, on a relatively large scale, for example during an acetylene production/purification process. In such a use the hybrid porous material may be SIFSIX-1-Cu.

The use of this second aspect may be to separate acetylene from ethylene and carbon dioxide and optionally other gases, on a relatively large scale, for example during an acetylene production/purification process. In such a use the hybrid porous material may be SIFSIX-1-Cu. According to a third aspect of the present invention, there is provided a hybrid porous material comprising a three-dimensional lattice of metal species (M) and linker groups;
wherein the metal species (M) are linked together in a first and second dimension by first linker groups ($L^1$) and are linked together in a third dimension by second linker groups ($L^2$) to form the three-dimensional lattice.
wherein the metal species (M) are linked together in a first and second dimension by first linker groups ($L^1$) and are linked together in a third dimension by second linker groups ($L^2$) to form the three-dimensional lattice; and
wherein one of $L^1$ and $L^2$ is an organic linker group and the other of $L^1$ and $L^2$ is an inorganic linker group.

Preferred features of the third aspect are as defined above in relation to the first and second aspects.

In preferred embodiments, the second linker groups ($L^2$) are inorganic compounds of formula $AX_n^{y-}$, wherein X is selected from F or Cl, n is an integer from 2 to 6, y is an integer from 0 to 2 and A is selected from Si, Ti, Sn, Zr or Ge. Suitably n is an integer from 4 to 6. Preferably n is 6. Preferably y is 2. Preferably X is F.

Suitably the second linker groups ($L^2$) are selected from $SiF_6^{2-}$, $TiF_6^{2-}$, $SnF_6^{2-}$, $ZrF_6^{2-}$ and $GeF_6^{2-}$.

Preferably the second linker group ($L^2$) is selected from $SiF_6^{2-}$, $TiF_6^{2-}$ and $SnF_6^{2-}$.

The present invention may provide an improved method of separating acetylene from a gas mixture, for example a gas mixture of acetylene and ethylene.

The method of the present invention may be used to provide acetylene and/or ethylene in a higher purity than methods of the prior art.

The method of the present invention may be energy efficient and thus cost effective.

In particular, the present invention may provide a method of removing relatively small amounts of acetylene from ethylene gas to provide ethylene in the high purity required in some applications, for example in polymer production, in a cost effective and energy efficient manner.

The hybrid porous materials used in the present invention may provide significantly greater acetylene adsorption capacity than materials of the prior art whilst retaining a high degree of selectively over ethylene.

Thus the present invention may be used to separate acetylene from a gas mixture comprising relatively large amounts of acetylene and ethylene, for example a 50:50 mixture of acetylene and ethylene.

The invention will now be further described by reference to the accompanying figures and examples.

In the following examples, the single crystal X-ray structures were obtained using the following single crystal X-ray diffraction instrument: Bruker Quest diffractometer equipped with a CMOS detector and 1 uS microfocus Cu X-ray source.

The purity of samples was verified using the following Powder diffraction instrument: a PANalytical X'Pert MPD Pro using Cu Kα radiation with a 1D X'Celerator strip detector.

The sorption isotherms were collected using the following gas sorption instruments: Micromeritics Tristar II 3030 and 3Flex 3500 surface characterization analyzers.

Samples were degassed (for activation) using the following degassing instrument: Micromeritics Smart VacPrep Gas Adsorption Sample Preparation Device.

EXAMPLE 1: SIFSIX-2-Cu-i

Synthesis of SIFSIX-2-Cu-i

A methanol solution (4.0 ml) of 4,4'-bipyridylacetylene (0.286 mmol) was mixed with an aqueous solution (4.0 ml) of $Cu(BF_4)_2.xH_2O$ (0.26 mmol) and $(NH_4)_2SiF_6$ (0.26 mmol) and then heated at 85° C. for 12 h. The resulting green microcrystalline solid, SIFSIX-2-Cu-i, was harvested by filtration.

Structure of SIFSIX-2-Cu-i

Figure 1B:
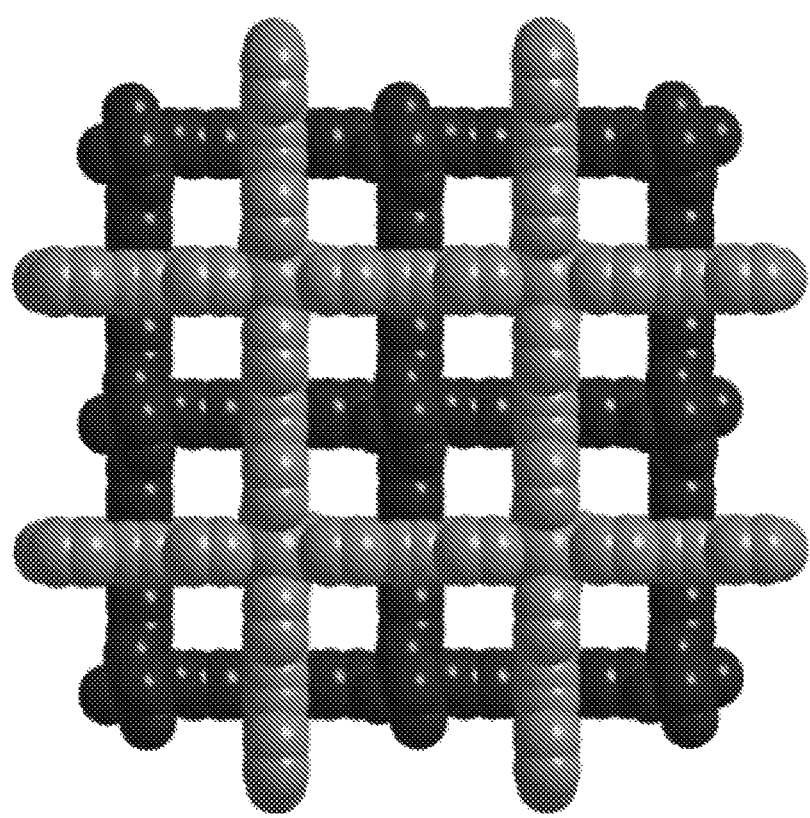

SIFSIX-2-Cu-i is a two-fold interpenetrated network comprising two SIFSIX-2-Cu hybrid porous material. In each of the two SIFSIX-2-Cu metal-organic frameworks, the copper cations and 4,4'-bipyridylacetylene ligands form a two dimensional (2D) layer which forms a three dimensional (3D) hybrid porous material of primitive cubic topology pillared by $SiF_6^{2-}$ anions. By "pillared" we mean that the $SiF_6^{2-}$ anions provides a link between the 2D layers of copper cations and 4,4'-bipyridylacetylene ligands to provide the 3D metal-organic framework. The independent hybrid porous materials interpenetrate in a staggered fashion, affording one dimensional (1D) channels with pores having an effective pore size of from 5 to 6 Å. The inorganic pillars, $SiF_6^{2-}$, are exposed on the inner surface of the pore and facilitate strong interactions with $C_2H_2$. FIG. 1A shows a single hybrid porous material of SIFSIX-2-Cu which when formed as an interpenetrated structure according to the above experimental procedure forms SIFSIX-2-Cu-i which is shown in FIG. 1B.

Figure 2A:
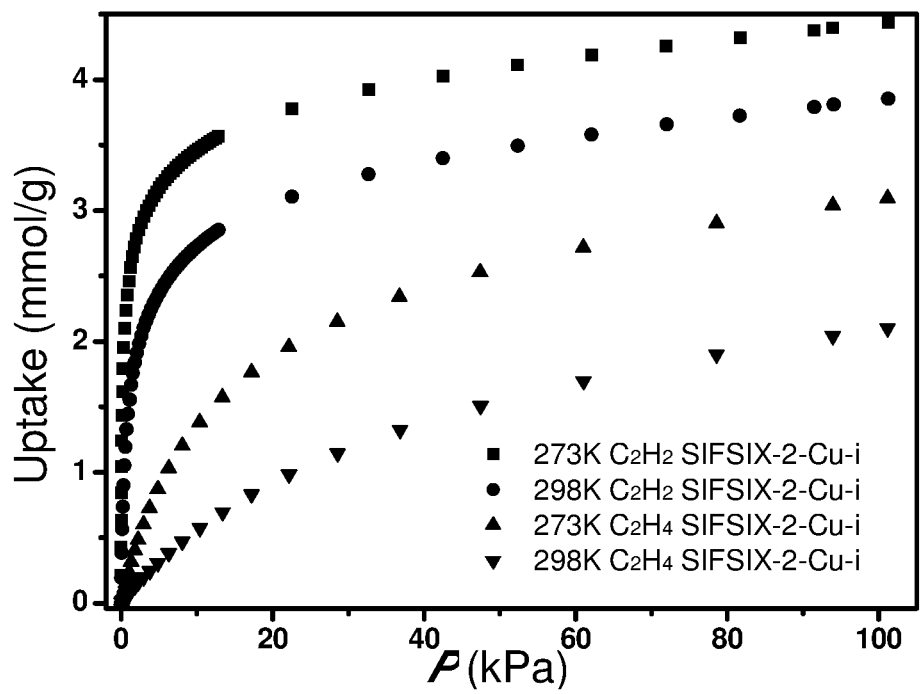
Figure 2B:
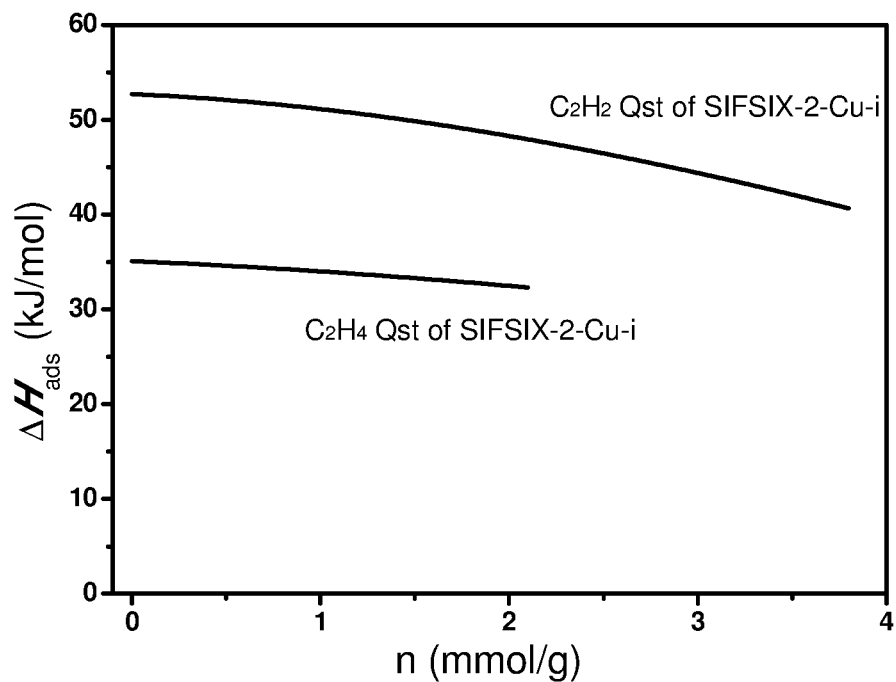

Pure Gas Sorption Studies of SIFSIX-2-Cu-i $C_2H_2$ and $C_2H_4$ sorption isotherms for SIFSIX-2-Cu-i were collected at 273 and 298 K. As seen in FIG. 2A, SIFSIX-2-Cu-i exhibits more uptake for $C_2H_2$ than $C_2H_4$, especially in the low pressure region. At 298 K, uptakes for $C_2H_2$ of 2.1 and 3.9 mmol/g were measured at 0.025 and 1 bar, respectively. Under the same conditions, $C_2H_4$ uptakes of only 0.15 and 2.0 mmol/g were measured. By using the Clausius-Clapeyron equation, isosteric heat (adsorption energy—Qst) for $C_2H_2$ was calculated as 52.7 kJ/mol, much higher than the 35.1 kJ/mol for $C_2H_4$, as shown in FIG. 2B.

Powder X-Ray Diffraction (PXRD) and Stability Data

Figure 3A:
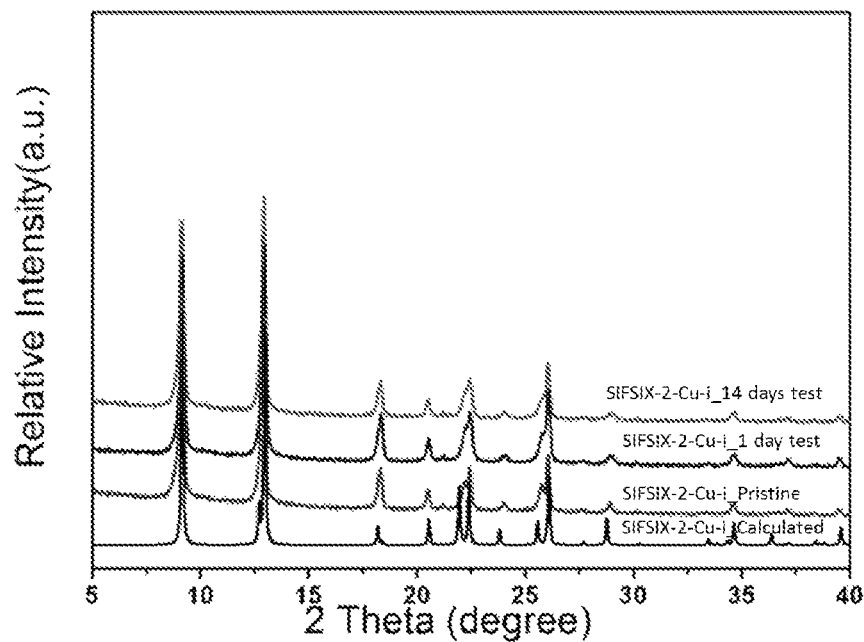
Figure 3B:
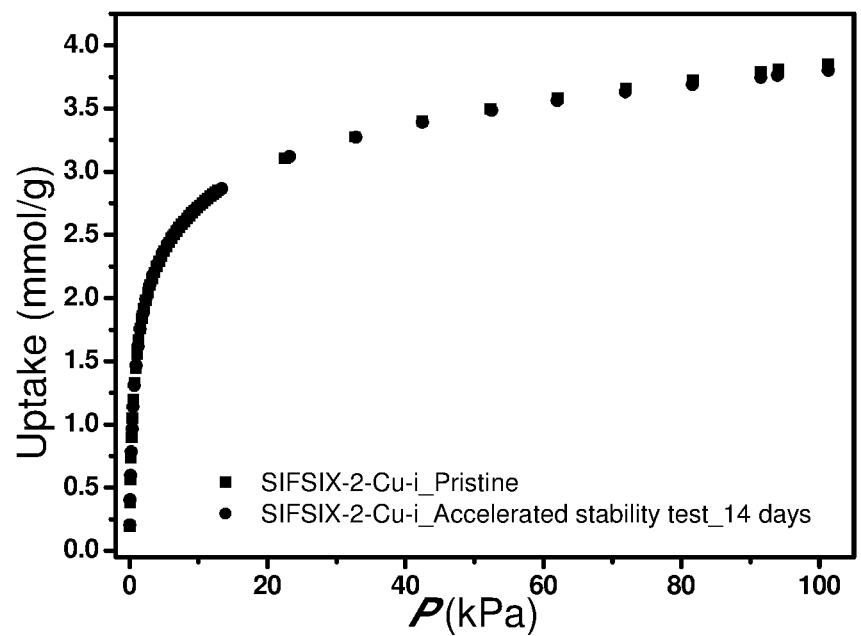

Stability to humidity of SIFSIX-2-Cu-i prepared according to the procedure above was tested by exposing the SIFSIX-2-Cu-i to 75% humidity and 40° C. for 1 day and 14 days. PXRD patterns of the samples after humidity testing (see FIG. 3A) were equivalent to those obtained for the pristine sample (before humidity testing). $C_2H_2$ isotherms for the exposed and pristine samples (FIG. 3B) show that SIFSIX-2-Cu-i is stable to humidity and that its sorption behaviour is not affected by exposure to humidity.

EXAMPLE 2: TIFSIX-2-Cu-i

Synthesis of TIFSIX-2-Cu-i

A methanol solution (4.0 ml) of 4,4'-bipyridylacetylene (0.286 mmol) was mixed with an aqueous solution (4.0 ml) of $Cu(BF_4)_2 \cdot xH_2O$ (0.26 mmol) and $(NH_4)_2TiF_6$ (0.26 mmol) and then heated at 85° C. for 12 h. The resulting green microcrystalline solid, TIFSIX-2-Cu-i, was harvested by filtration.

Structure of TIFSIX-2-Cu-i

Figure 4A:
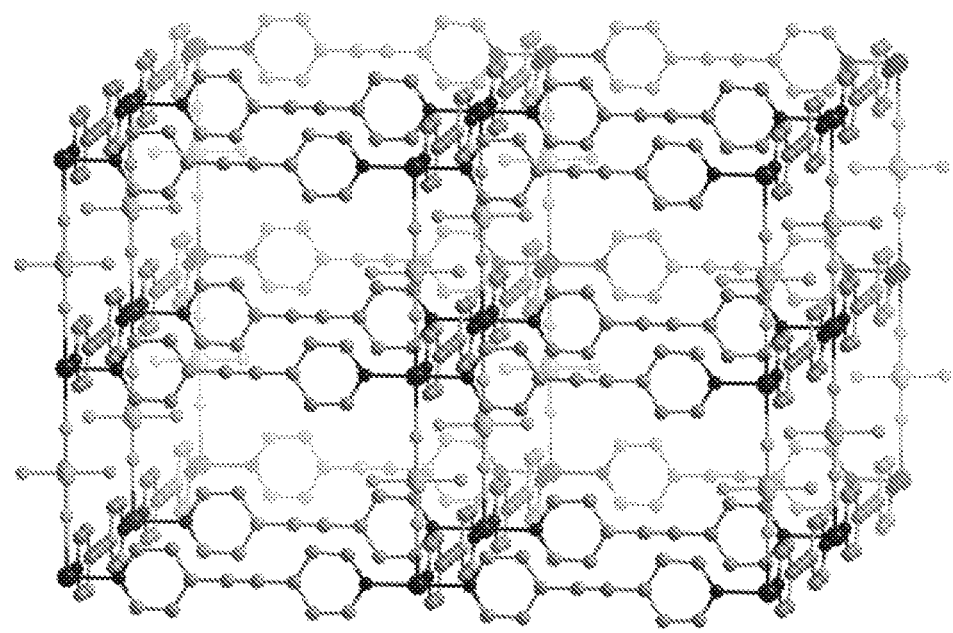
Figure 4B:
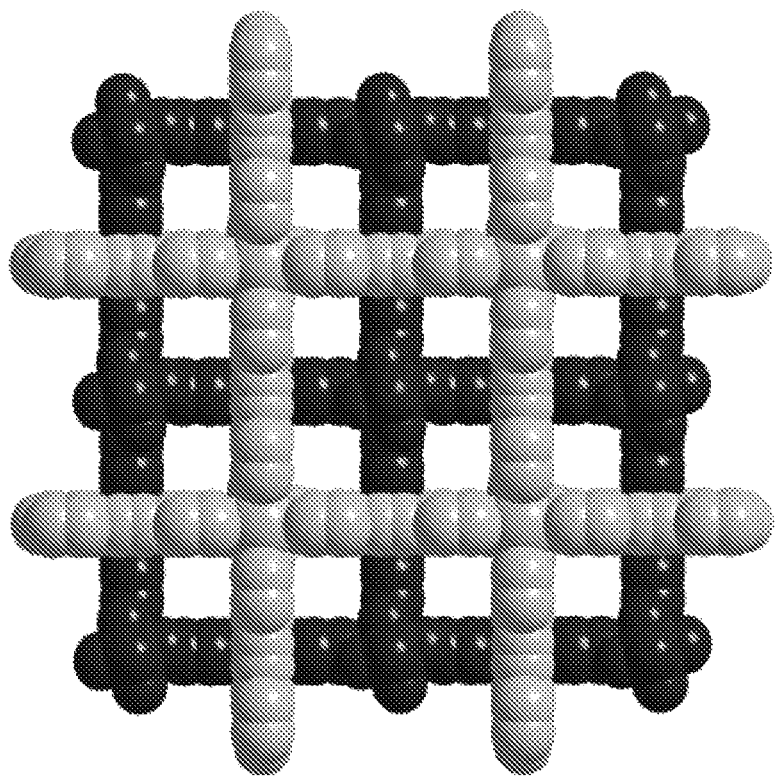

TIFSIX-2-Cu-i is a two-fold interpenetrated network comprising two TIFSIX-2-Cu metal-organic frameworks. In each of the two TIFSIX-2-Cu metal-organic frameworks, the copper cations and 4,4'-bipyridylacetylene ligands form a 2D layer which forms a 3D hybrid porous material of primitive cubic topology pillared by $SiF_6^{2-}$ anions. The independent hybrid porous materials interpenetrate in a staggered fashion, affording 1D channels with pores having an effective pore size of from 5 to 6 Å. The inorganic pillars, $TiF_6^{2-}$, are exposed on the inner surface of the pore and facilitate strong interactions with $C_2H_2$. FIG. 4A shows a single hybrid porous material of TIFSIX-2-Cu which when formed as an interpenetrated structure according to the above experimental procedure forms TIFSIX-2-Cu-i which is shown in FIG. 4B.

Figure 5A:
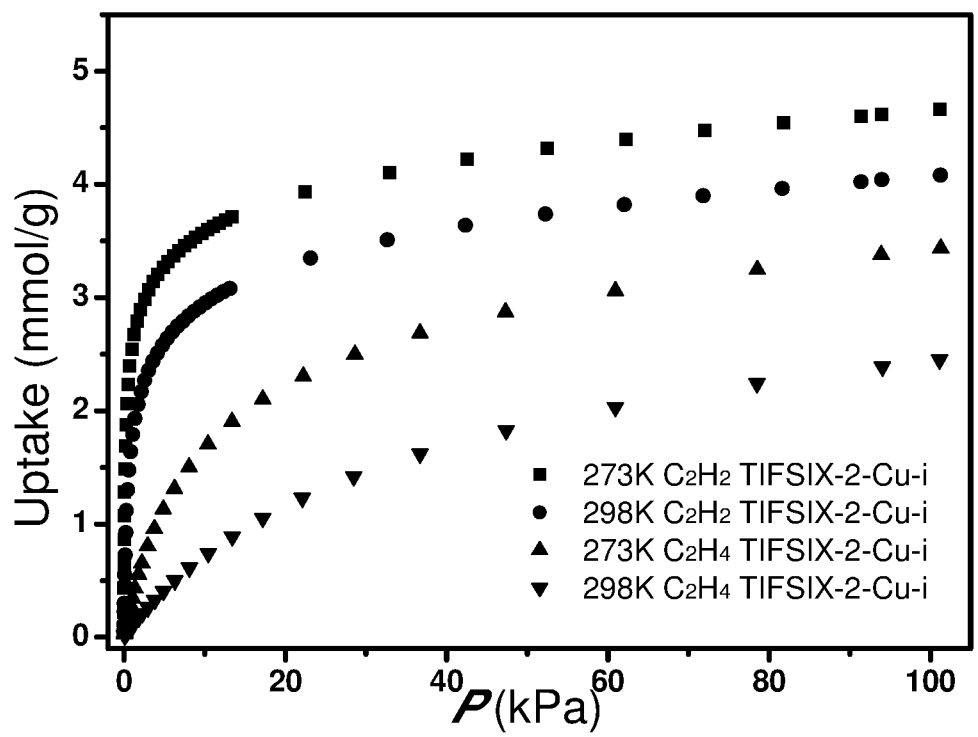
Figure 5B:
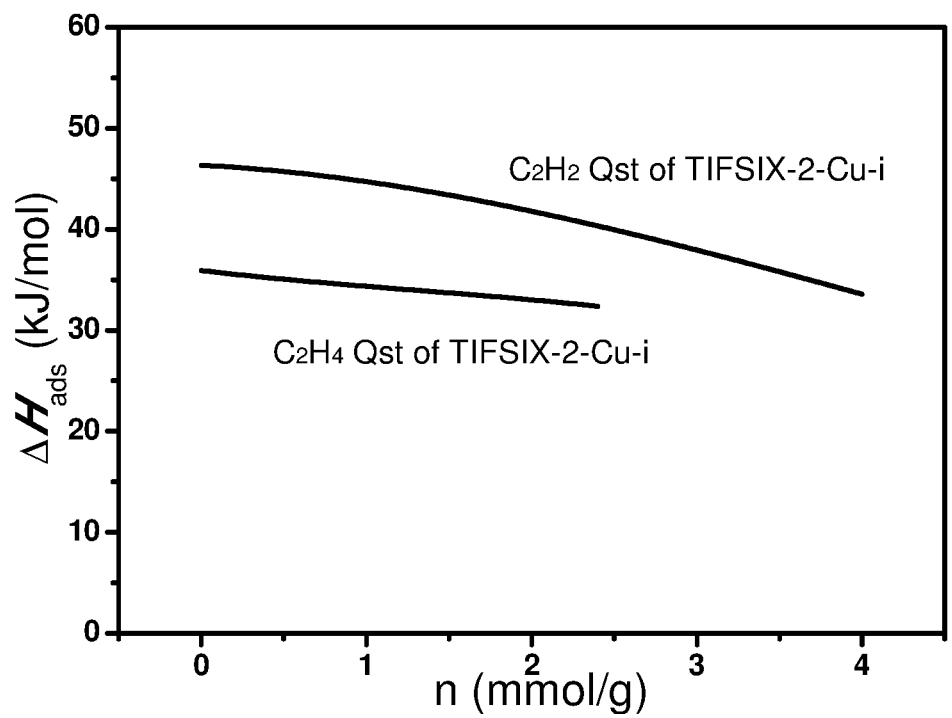

Pure Gas Sorption Studies of TIFSIX-2-Cu-i $C_2H_2$ and $C_2H_4$ sorption isotherms for TIFSIX-2-Cu-i were obtained at 273 and 298 K. As seen in FIG. 5A, TIFSIX-2-Cu-i exhibits more uptake for $C_2H_2$ than $C_2H_4$, especially in the low pressure region. At 298 K, uptakes for $C_2H_2$ of 2.2 and 4.1 mmol/g were measured at 0.025 and 1 bar, respectively. Under the same conditions, $C_2H_4$ uptakes of only 0.22 and 2.5 mmol/g were measured. By using the Clausius-Clapeyron equation, isosteric heat (adsorption energy—Qst) for $C_2H_2$ was calculated as 46.3 kJ/mol, much higher than the 35.9 kJ/mol for $C_2H_4$, as shown in FIG. 5B.

Powder X-Ray Diffraction (PXRD) and Stability Data

Figure 6A:
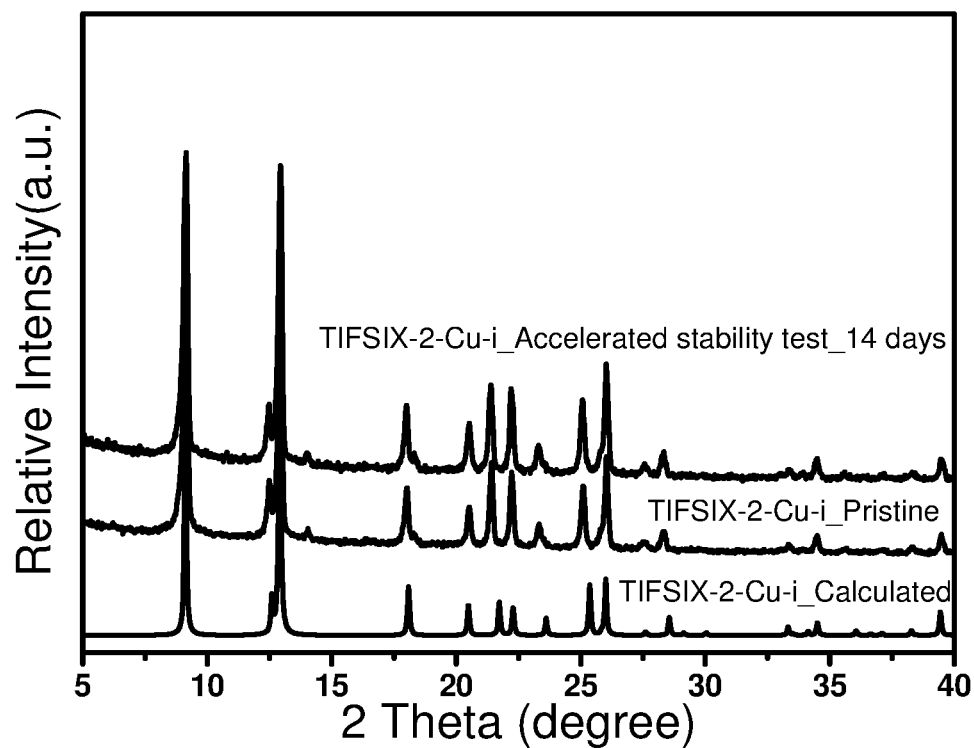
Figure 6B:
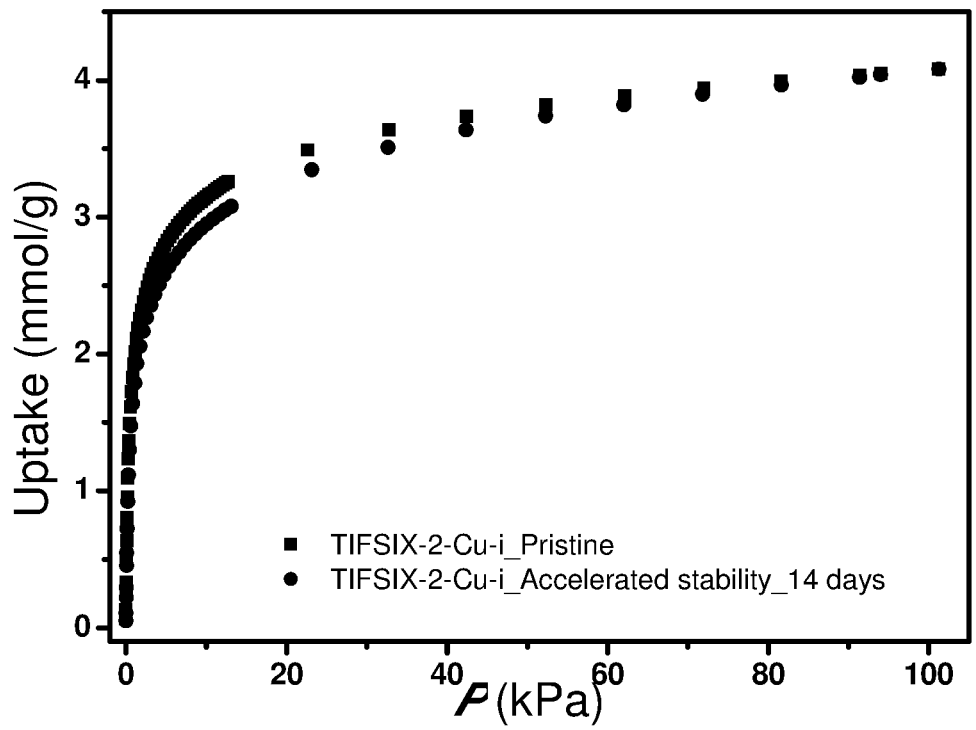

Stability to humidity of TIFSIX-2-Cu-i prepared according to the procedure above was tested by exposing TIFSIX-2-Cu-i to 75% humidity and 40° C. for 14 days. PXRD patterns of samples after humidity testing (see FIG. 6A) were equivalent to those obtained for the pristine sample (before humidity testing). $C_2H_2$ isotherms for the exposed and pristine samples (FIG. 6B) show that TIFSIX-2-Cu-i is stable to humidity and that its sorption behaviour is not affected by exposure to humidity.

EXAMPLE 3: SNFSIX-2-Cu-i

Synthesis of SNFSIX-2-Cu-i

A methanol solution (4.0 ml) of 4,4'-bipyridylacetylene (0.286 mmol) was mixed with an aqueous solution (4.0 ml) of $Cu(BF_4)_2 \cdot xH_2O$ (0.26 mmol) and $(NH_4)_2SnF_6$ (0.26 mmol) and then heated at 85° C. for 12 h. The resulting green microcrystalline solid, SNFSIX-2-Cu-i, was harvested by filtration.

Structure of SNFSIX-2-Cu-i

Figure 7A:
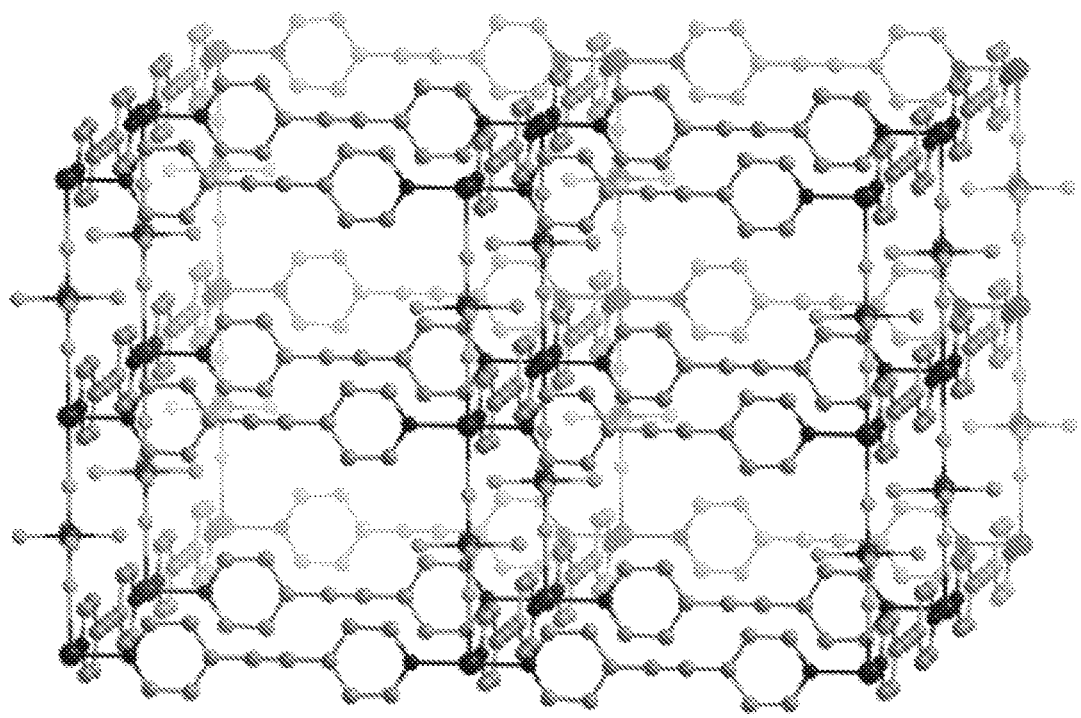
Figure 7B:
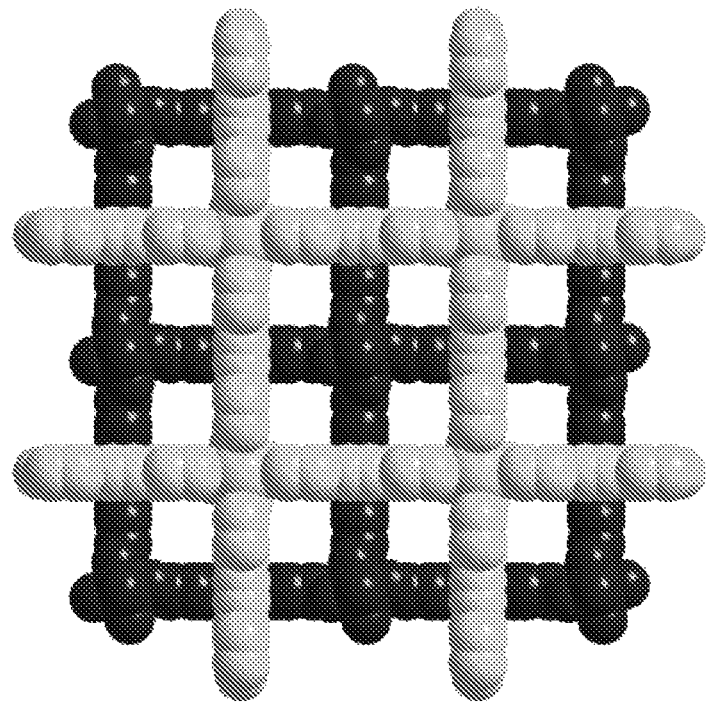

SNFSIX-2-Cu-i is a two-fold interpenetrated network comprising two SNFSIX-2-Cu metal-organic frameworks. In each of the two SNFSIX-2-Cu metal-organic frameworks, the copper cations and 4,4'-bipyridylacetylene ligands form a two dimensional (2D) layer which forms a three dimensional (3D) hybrid porous material of primitive cubic topology pillared by $SiF_6^{2-}$ anions. The independent hybrid porous materials interpenetrate in a staggered fashion, affording 1D channels with pores having an effective pore size of from 5 to 6 Å. The inorganic pillars, $SnF_6^{2-}$, are exposed to the pore surface and facilitate strong interactions with $C_2H_2$. FIG. 7A shows a single hybrid porous material of SNFSIX-2-Cu which when formed as an interpenetrated structure according to the above experimental procedure forms SNFSIX-2-Cu-i which is shown in FIG. 7B.

Figure 8A:
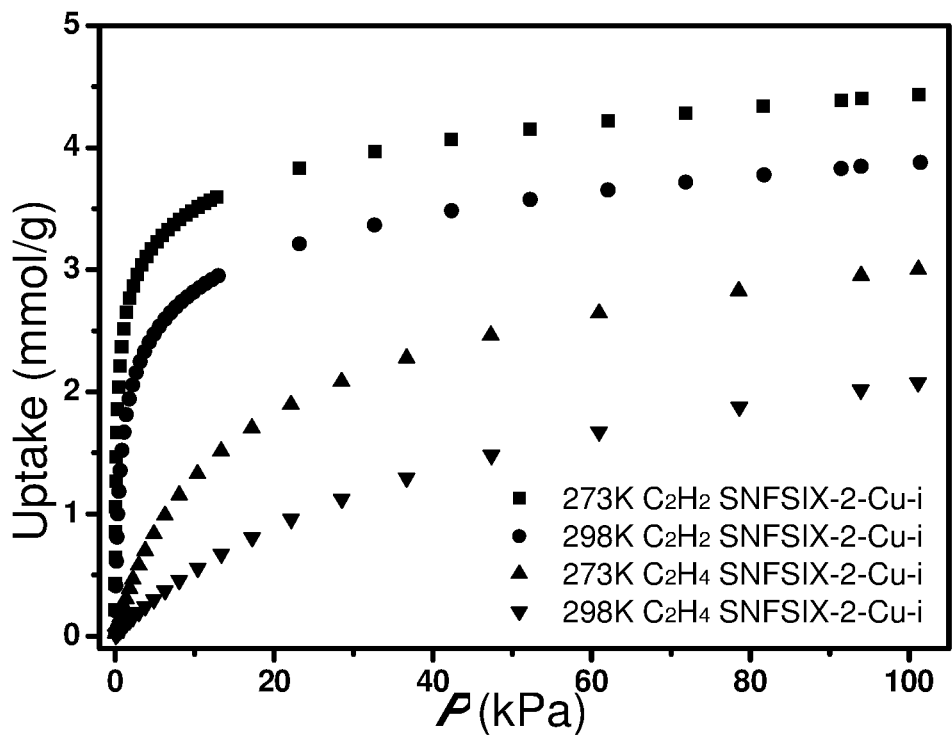
Figure 8B:
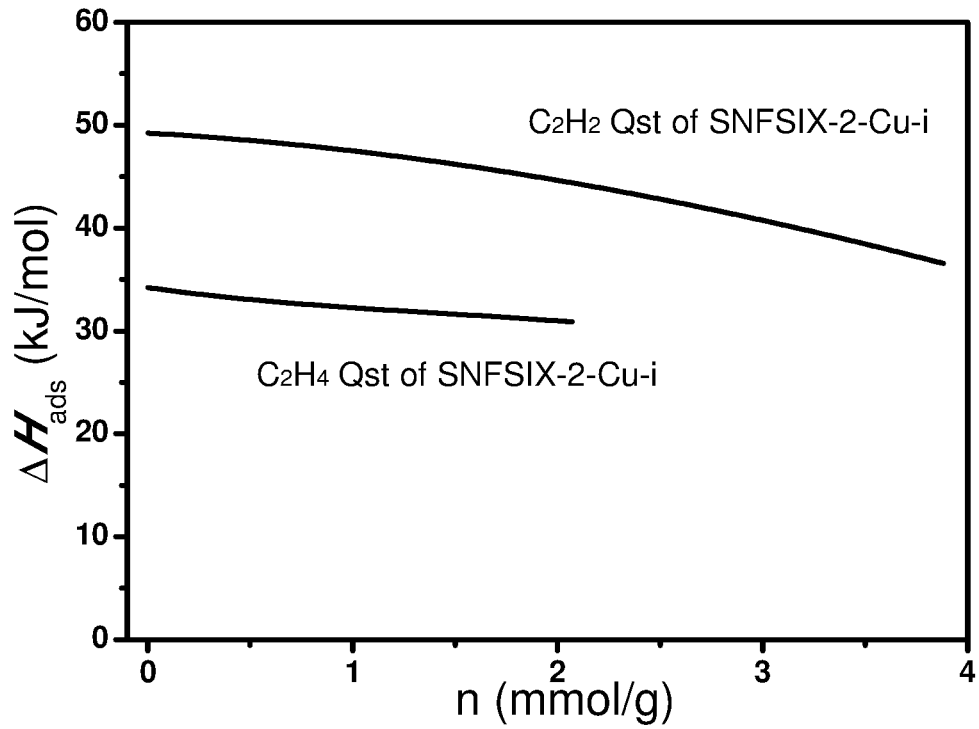

Pure Gas Sorption Studies of SNFSIX-2-Cu-i $C_2H_2$ and $C_2H_4$ sorption isotherms for SNFSIX-2-Cu-i were collected at 273 and 298 K. As seen in FIG. 8A, SNFSIX-2-Cu-i exhibits more uptake for $C_2H_2$ than $C_2H_4$, especially in the low pressure region. At 298 K, uptakes for $C_2H_2$ of 2.1 and 3.8 mmol/g were measured at 0.025 and 1 bar, respectively. Under the same conditions, $C_2H_4$ uptakes of only 0.17 and 2.1 mmol/g were measured. By using the Clausius-Clapeyron equation, isosteric heat (adsorption energy—Qst) for $C_2H_2$ was calculated as 49.2 kJ/mol, much higher than the 34.2 kJ/mol for $C_2H_4$, as shown in FIG. 8B.

Powder X-Ray Diffraction (PXRD) and Stability Data

Figure 9A:
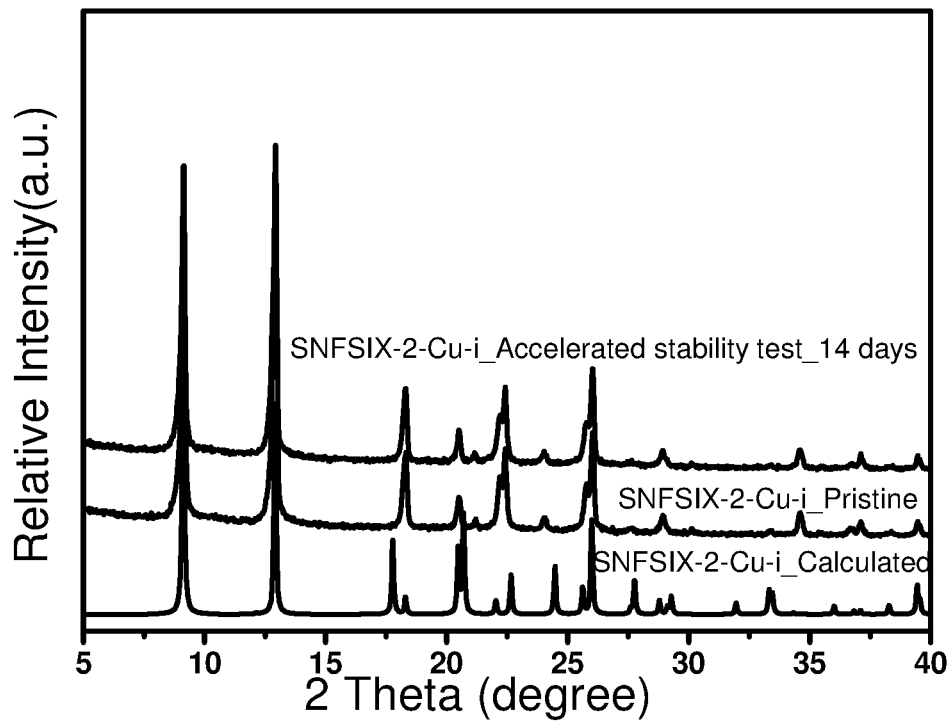
Figure 9B:
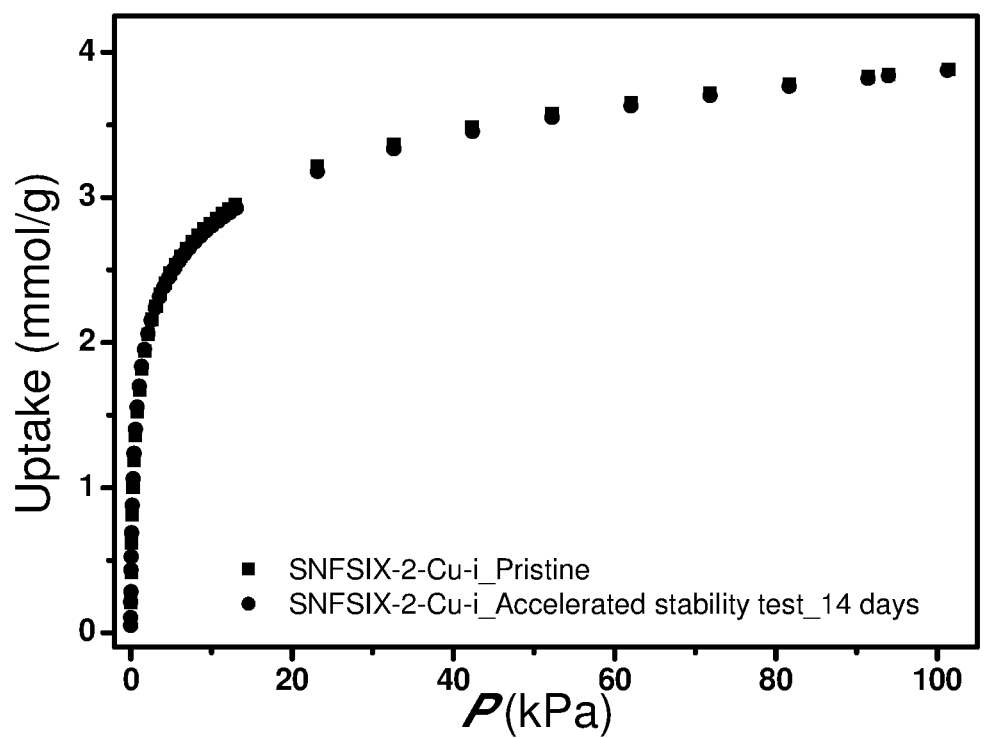

Stability to humidity of SNFSIX-2-Cu-i prepared according to the procedure above was tested by exposing the SNFSIX-2-Cu-i to 75% humidity and 40° C. for 14 days. PXRD patterns of samples after humidity testing (see FIG. 9A) were equivalent to those obtained for the pristine sample (before humidity testing). $C_2H_2$ isotherms for the exposed and pristine samples (see FIG. 9B) show that SNFSIX-2-Cu-i is stable to humidity and that its sorption behaviour is not affected by exposure to humidity.

EXAMPLE 4: SIFSIX-3-Ni

Synthesis of SIFSIX-3-Ni 0.32 g of pyrazine (4 mmol) and 0.62 g of $NiSiF_6 \cdot 6H_2O$ (2 mmol) were added to 3 ml $H_2O$, and the suspension was stirred for days. The resulting purple microcrystalline solid, SIFSIX-3-Ni, was harvested by filtration.

Structure of SIFSIX-3-Ni

Figure 10A:
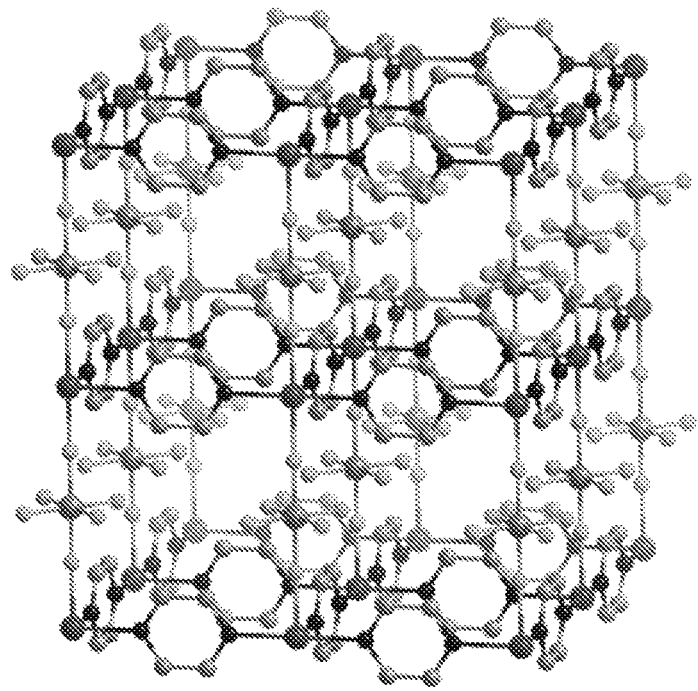
Figure 10B:
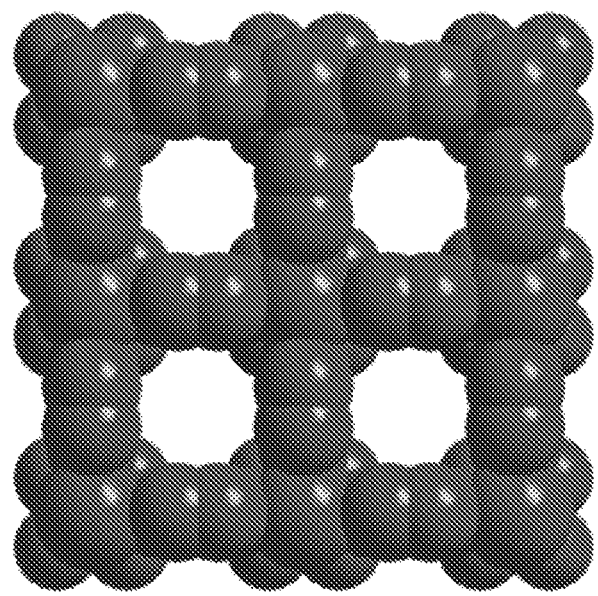

SIFSIX-3-Ni is a 3D hybrid porous material of primitive cubic topology. In this structure, the metal cations and pyrazine ligands generate a 2D layer pillared by $SiF_6^{2-}$ anions (see FIGS. 10A and 10B). This structure comprises 1D channels pores having an effective pore size of approximately 3.7 Å. The inorganic pillars, $SiF_6^{2-}$, are exposed to the inner surface of the pores and facilitate strong interactions with $C_2H_2$.

Figure 11A:
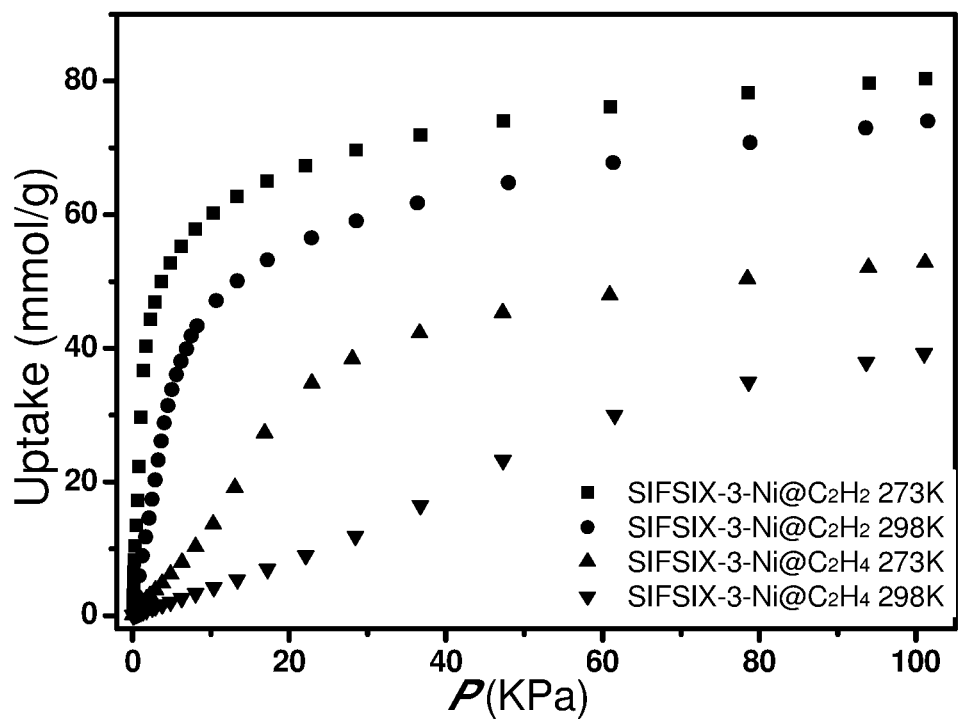
Figure 11B:
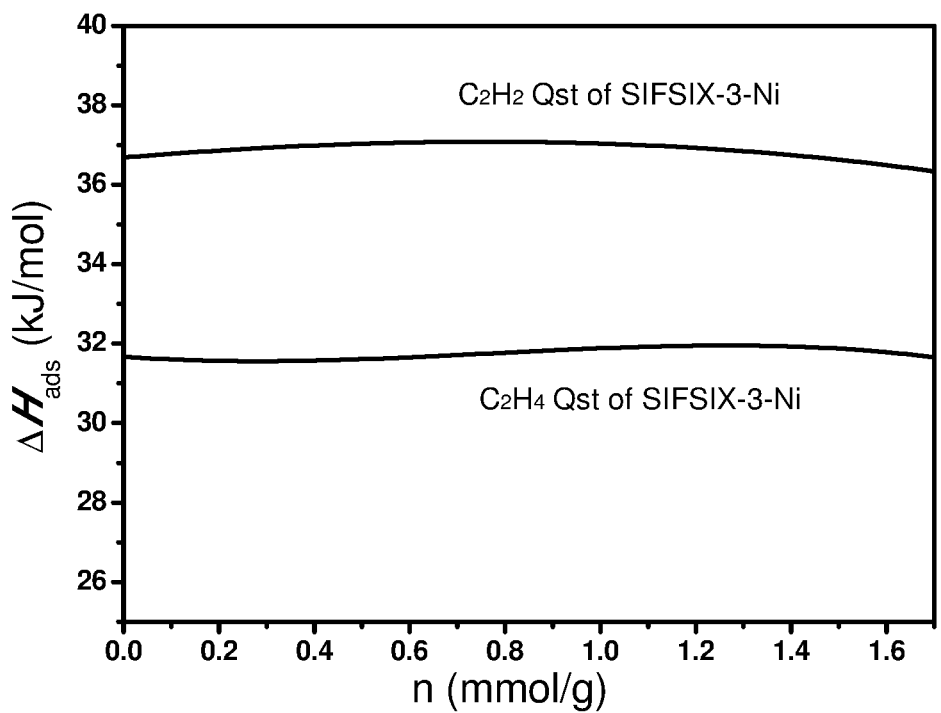

Pure Gas Sorption Studies of SIFSIX-3-Ni $C_2H_2$ and $C_2H_4$ sorption isotherms for SIFSIX-3-Ni were collected at 273 and 298 K. As seen in FIG. 11A, SIFSIX-3-Ni exhibits more uptake for $C_2H_2$ than $C_2H_4$, especially in the low pressure region. At 298 K, uptakes for $C_2H_2$ of 0.77 and 3.3 mmol/g were measured at 0.025 and 1 bar, respectively. Under the same conditions, $C_2H_4$ uptakes of only 0.05 and 1.75 mmol/g were measured. By using the Clausius-Clapeyron equation, isosteric heat (adsorption energy—Qst) for $C_2H_2$ was calculated as 36.7 kJ/mol, much higher than the 31.6 kJ/mol for $C_2H_4$, as shown in FIG. 11B.

Powder X-Ray Diffraction (PXRD) and Stability Data

Figure 12A:
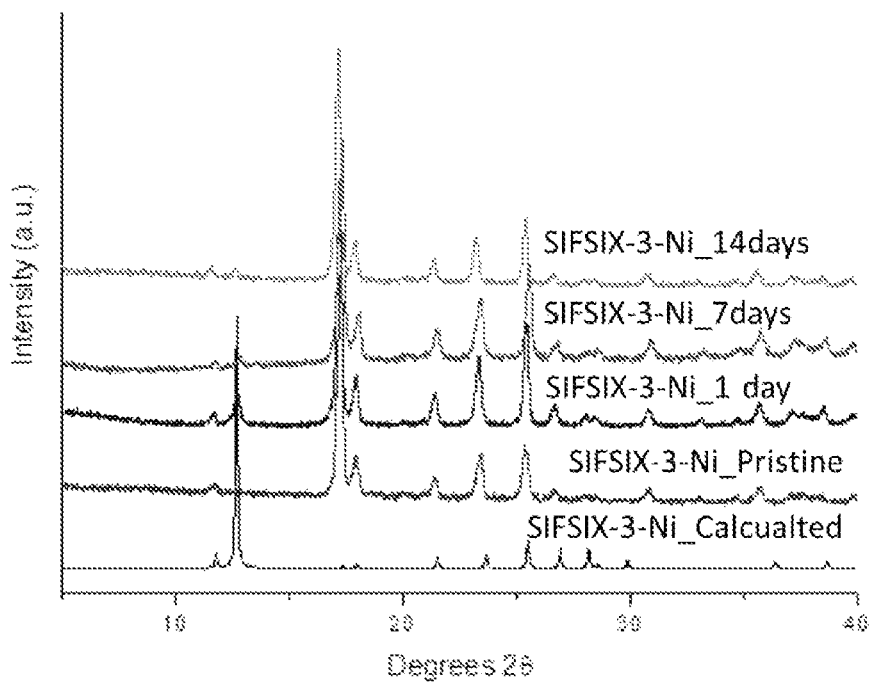
Figure 12B:
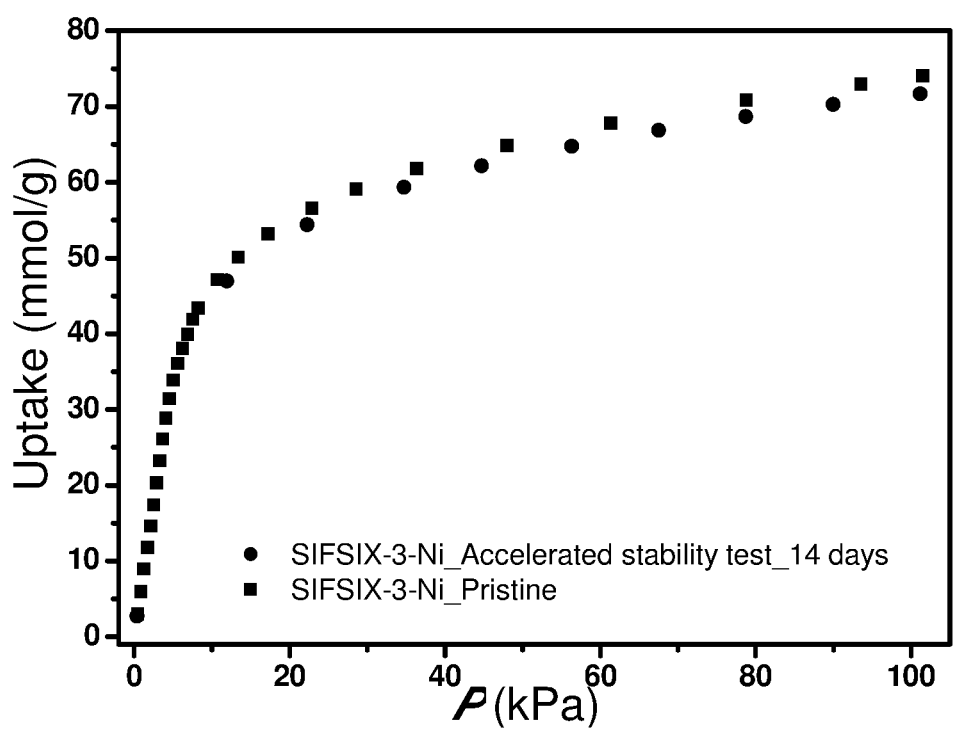

Stability to humidity of SIFSIX-3-Ni prepared according to the procedure above was tested by exposing the SIFSIX-3-Ni to 75% humidity and 40° C. for 1, 7 and 14 days. PXRD patterns of samples after humidity testing (see FIG. 12A) were equivalent to those obtained for the pristine sample (before humidity testing). $C_2H_2$ isotherms for the exposed and pristine samples (see FIG. 12B) show that SIFSIX-3-Ni is stable to humidity and that its sorption behaviour is not affected by exposure to humidity.

EXAMPLE 5: SIFSIX-1-Cu

Synthesis of SIFSIX-1-Cu 0.35 g 4,4'-bipyridine was dissolved in 40 ml ethylene glycol at 65° C. An aqueous solution (20 ml) of Cu $(BF_4)_2 \cdot xH_2O$ (266 mg, 1.12 mmol) and $(NH_4)_2SiF_6$ (199 mg, 1.12 mmol) was added to the above solution before the mixture was heated at 65° C. for 3 h under stirring. The obtained purple powder was filtered, washed with methanol, and exchanged with methanol for 3 days.

Structure of SIFSIX-1-Cu

Figure 13:
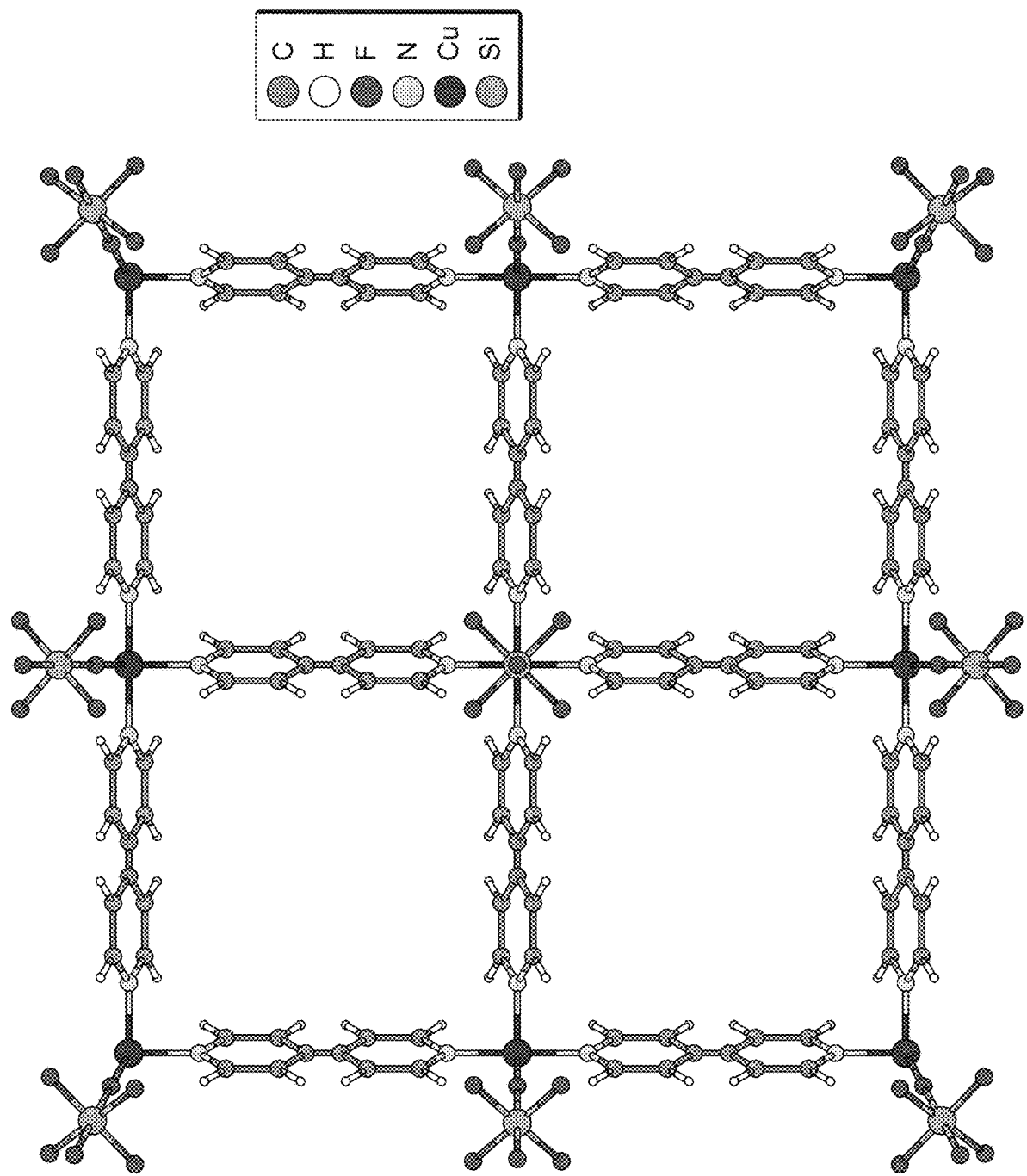

SIFSIX-1-Cu is a 3D hybrid porous material wherein the metal cation and 4,4'-bipyridine ligands generate a 2D square grid network which forms a 3D primitive cubic network pillared by $SiF_6^{2-}$ anions (see FIG. 13). The 3D hybrid porous material provides channels with pores having an effective pore size of approximately 8 Å and a pore repeat distance along the c axis (defined by the Cu—$SiF_6$—Cu bonds, i.e. the $M-L^2-M$ bonds) of from 7 to 8 Å. The inorganic pillars, $SiF_6^{2-}$, are exposed to the pore inner surface and facilitate strong interactions with $C_2H_2$.

Figure 14A:
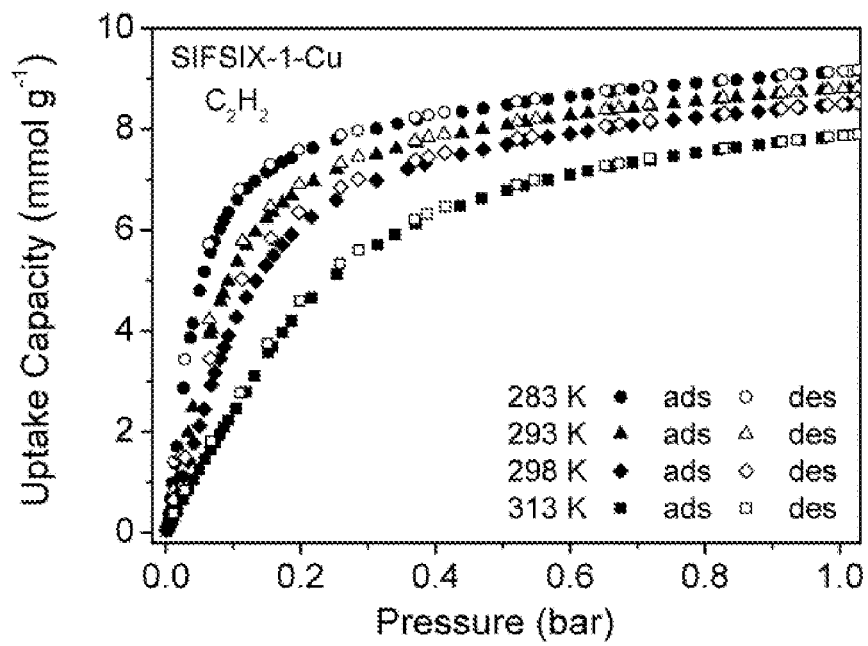
Figure 14B:
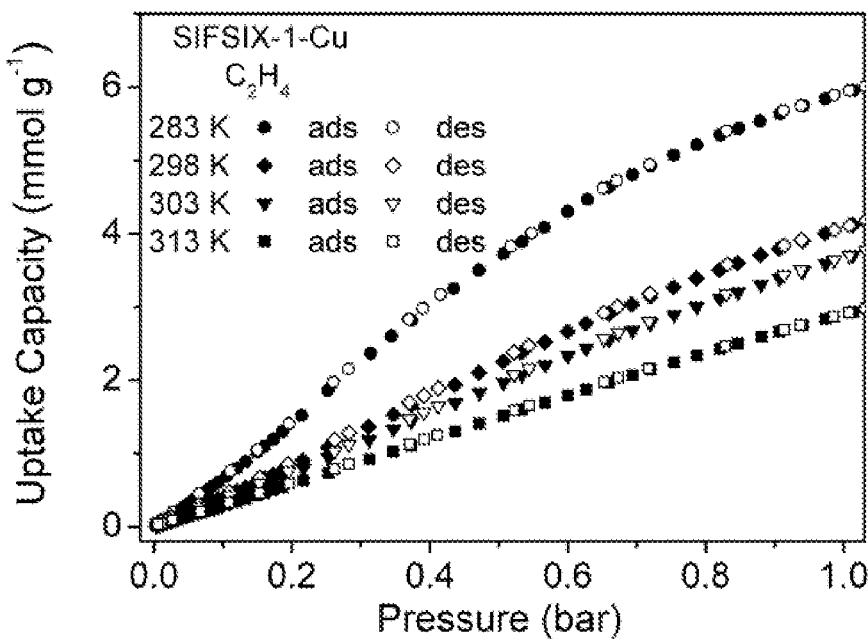
Figure 15:
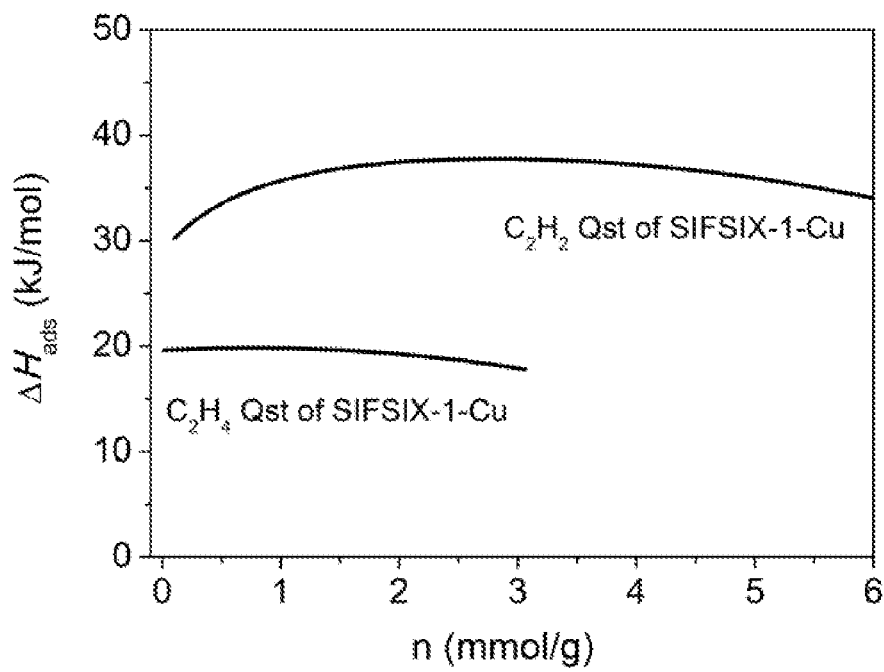

Pure Gas Sorption Studies of SIFSIX-1-Cu $C_2H_2$ and $C_2H_4$ sorption isotherms for SIFSIX-1-Cu were collected between 283 and 313 K. As seen in FIG. 14A, SIFSIX-1-Cu exhibits a high uptake of acetylene (8.5 mmol/g) at 298 K and 1.0 bar. The $C_2H_2$ uptake of SIFSIX-1-Cu is among the highest yet reported with MOFs and other porous adsorbents. Under the same conditions, only 4.1 mmol/g of $C_2H_4$ was adsorbed on SIFSIX-1-Cu (see FIG. 14B). By using the Clausius-Clapeyron equation, the isosteric heat for $C_2H_2$ and $C_2H_4$ were calculated and are shown in FIG. 15. The Qst of $C_2H_2$ (37 kJ/mol) for SIFSIX-1-Cu is much higher than the Qst for $C_2H_4$ (19.7 kJ/mol).

Powder X-Ray Diffraction (PXRD)

Figure 16:
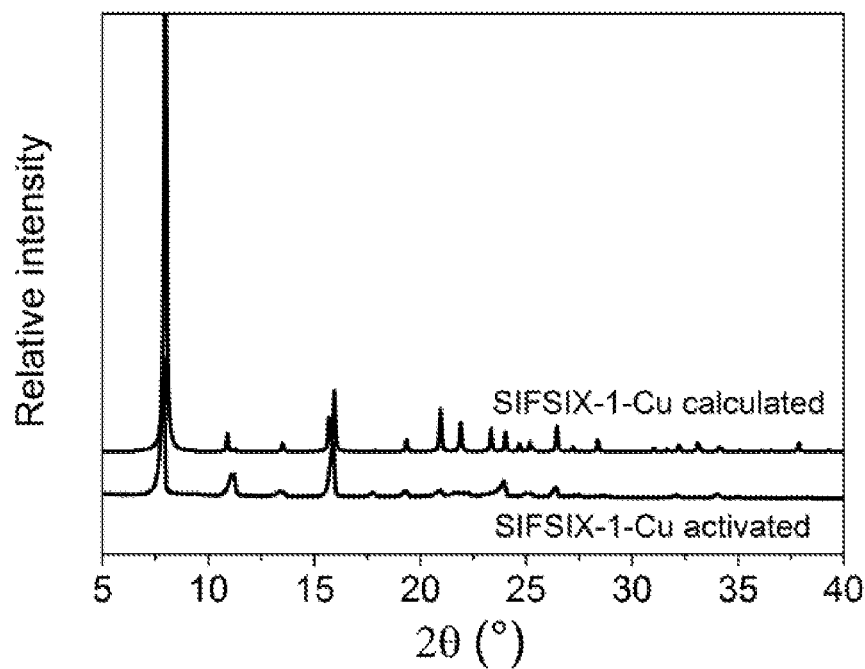

FIG. 16 shows PXRD patterns for SIFSIX-1-Cu.

EXAMPLE 6: SIFSIX-2-Cu

Synthesis of SIFSIX-2-Cu

An ethanol solution (2.0 ml) of 4,4'-bipyridylacetylene (0.115 mmol) was carefully layered onto an ethylene glycol solution (2.0 ml) of $CuSiF_6 \cdot xH_2O$ (0.149 mmol). Crystals of SIFSIX-2-Cu were obtained after two weeks. The obtained sample was exchanged with ethanol for 4 days.

Structure of SIFSIX-2-Cu

Figure 17:
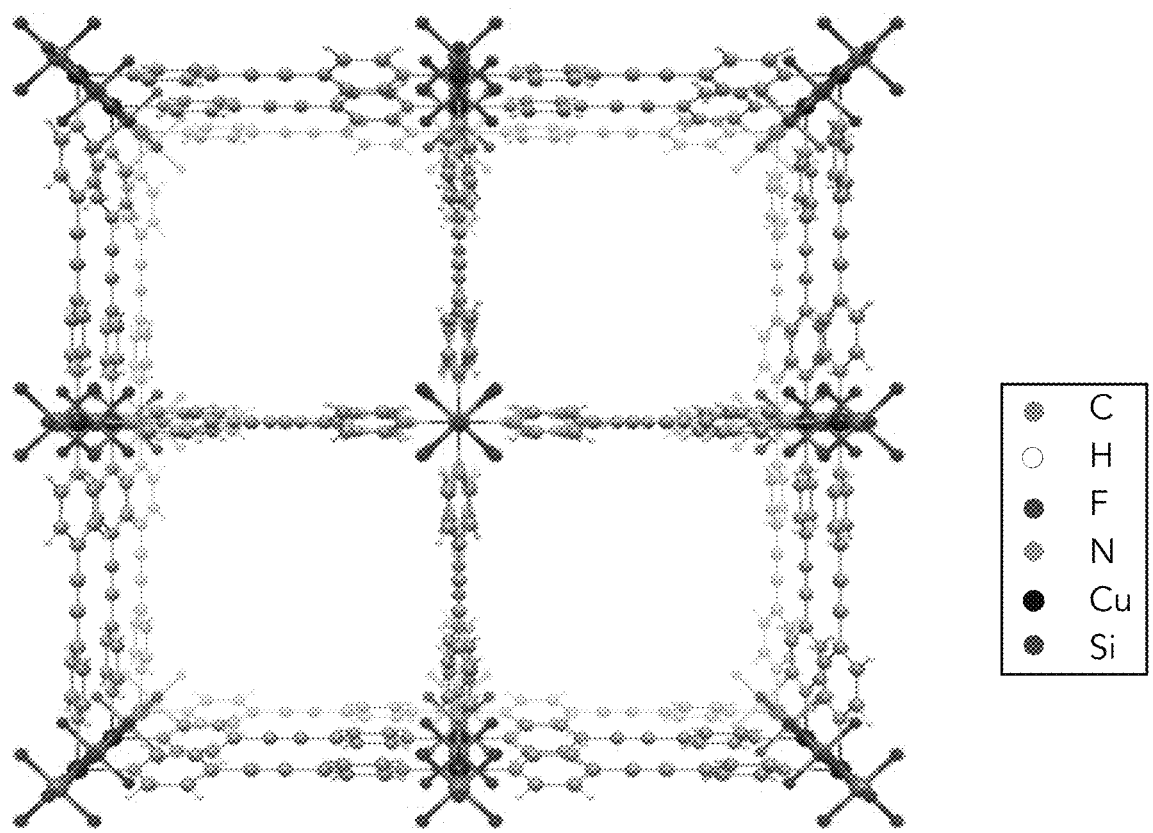

SIFSIX-2-Cu is a 3D hybrid porous material having a primitive-cubic coordination network with square channels (pores), as shown in FIG. 17. The metal cation and 4,4'-bipyridylacetylene ligands generate a 2D square grid network which forms a 3D network of primitive cubic topology pillared by $SiF_6^{2-}$ anions. The channels comprise pores having an effective pore size of approximately 10.5 Å and a pore repeat distance along the c axis (defined by the Cu—$SiF_6$—Cu bonds, i.e. the $M-L^2-M$ bonds) of approximately 10.5 Å. The inorganic pillars, $SiF_6^{2-}$, are exposed to the pore inner surface and facilitate interactions with $C_2H_2$.

Figure 18A:
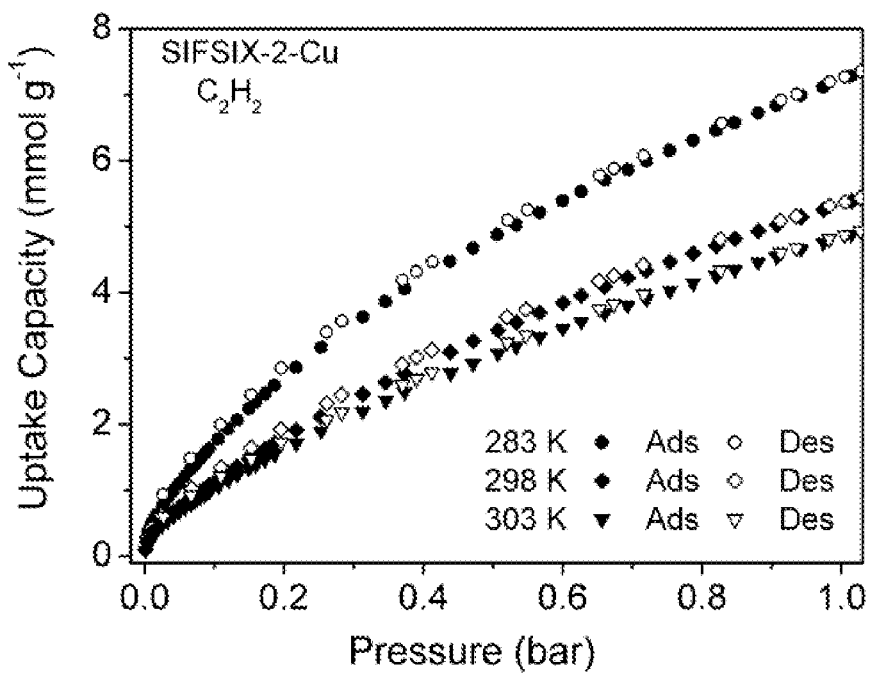
Figure 18B:
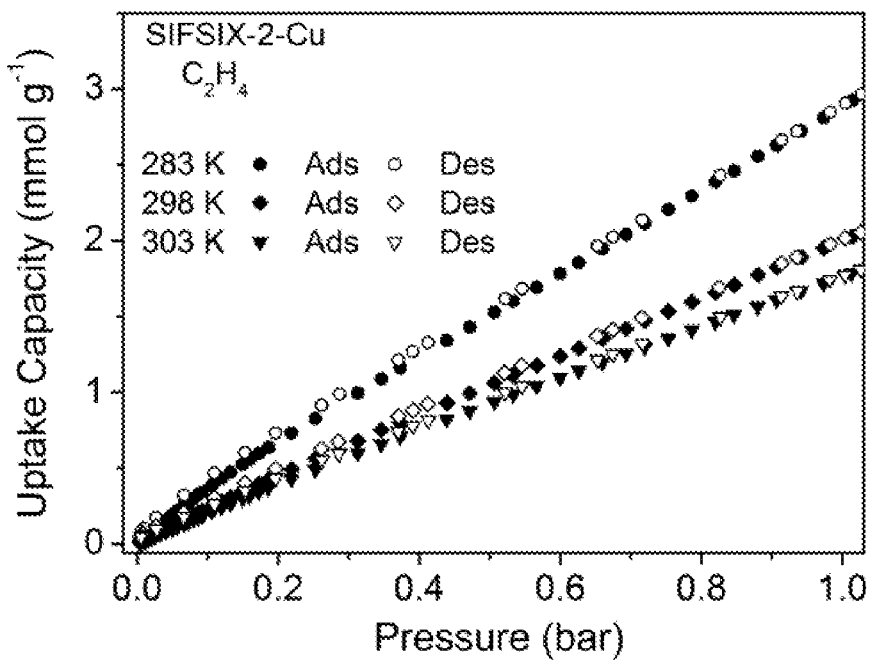

Pure Gas Sorption Studies of SIFSIX-2-Cu $C_2H_2$ and $C_2H_4$ sorption isotherms for SIFSIX-2-Cu were collected between 283 K and 303 K. As seen in FIGS. 18A and 18B, SIFSIX-2-Cu exhibits type-II isotherm for both $C_2H_2$ and $C_2H_4$ with a $C_2H_2$ uptake of 5.38 mmol/g at 298 K and 1.0 bar. Under the same conditions, SIFSIX-2-Cu uptakes only 2.02 mmol/g of $C_2H_4$.

Figure 19:
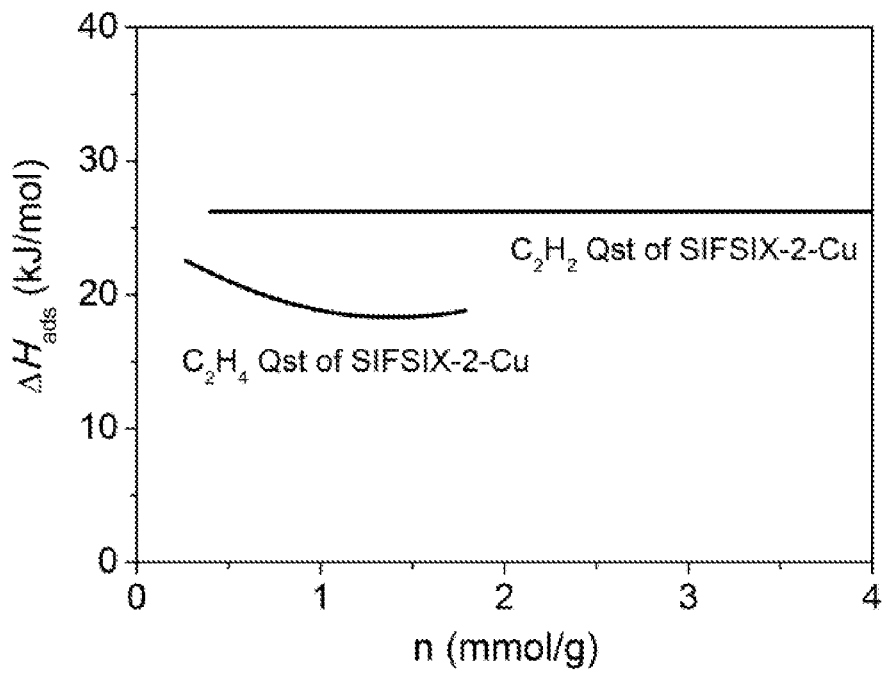

FIG. 19 shows $C_2H_2$ and $C_2H_4$ adsorption energy (Qst) of SIFSIX-2-Cu.

Powder X-Ray Diffraction (PXRD)

Figure 20:
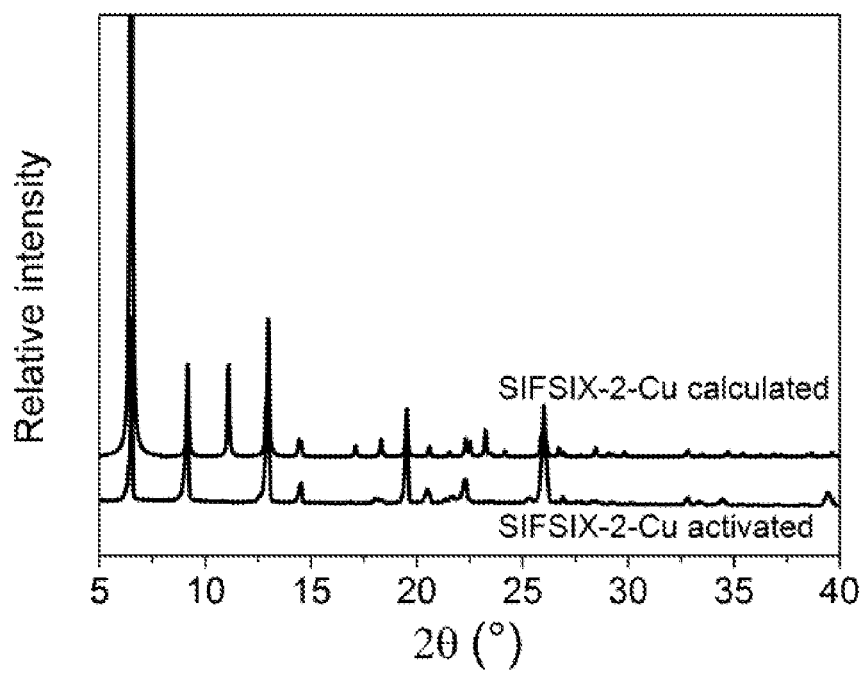

FIG. 20 shows PXRD patterns of SIFSIX-2-Cu.

EXAMPLE 7: SIFSIX-3-Zn

Synthesis of SIFSIX-3-Zn

A methanol solution (2.0 ml) of pyrazine (1.3 mmol) was carefully layered onto a methanol solution (2.0 ml) of $ZnSiF_6 \cdot xH_2O$ (0.13 mmol). Colourless crystals of SIFSIX-3-Zn were obtained after two days. The obtained sample was exchanged with ethanol for 1 day.

Structure of SIFSIX-3-Zn

Figure 21:
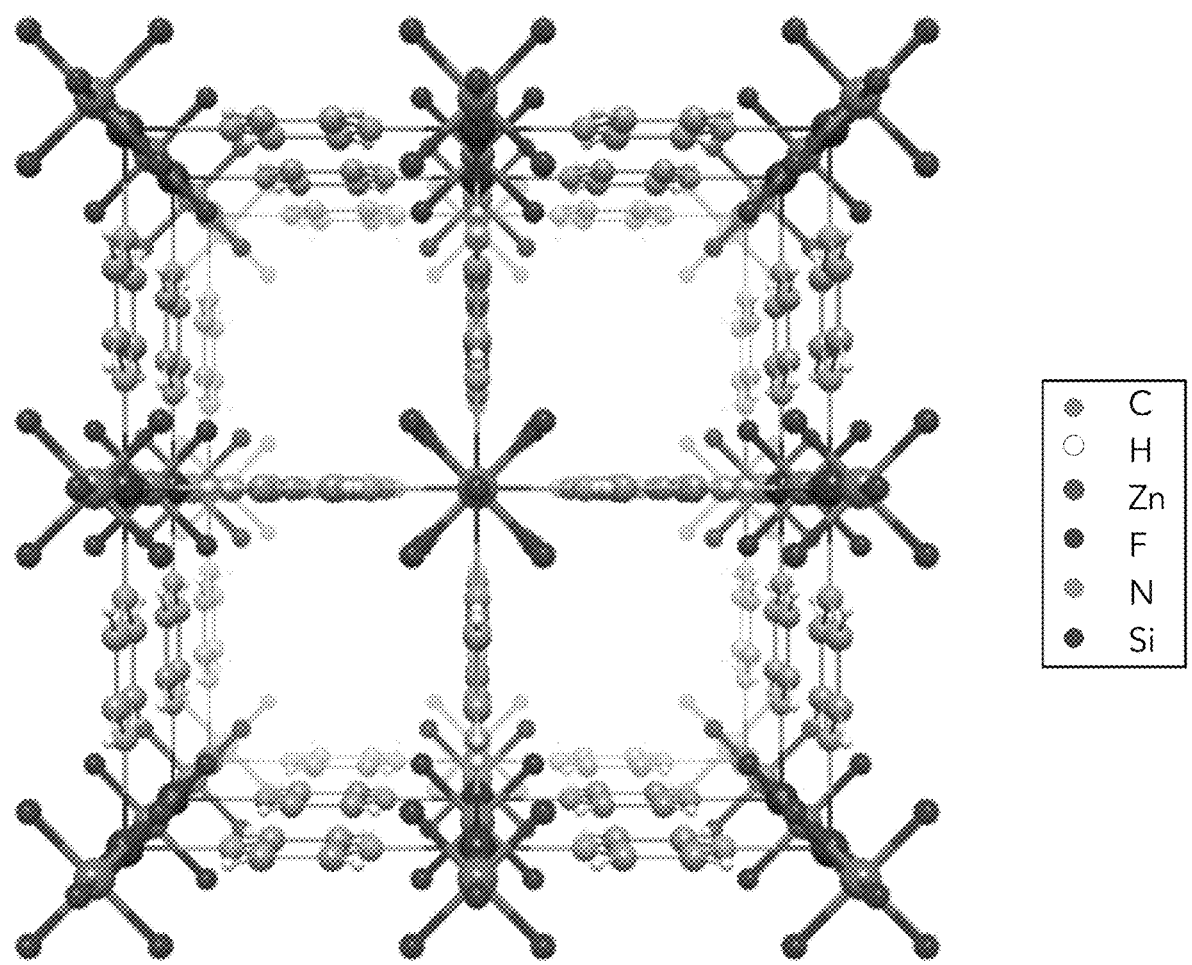

SIFSIX-3-Zn is a 3D hybrid porous material having a primitive-cubic coordination network with square channels (pores) as shown in FIG. 21. The metal cation and pyrazine ligands generate a 2D square grid network which forms a 3D network of primitive cubic topology pillared by $SiF_6^{2-}$ anions. The channels have pores having an effective pore size of approximately 4.2 Å and a pore repeat distance along the c axis (defined by the Zn—$SiF_6$—Zn bonds, i.e. the $M-L^2-M$ bonds) of 4.2 Å. The inorganic pillars, $SiF_6^{2-}$, are exposed to the pore surface and facilitate strong interactions with $C_2H_2$.

Figure 22A:
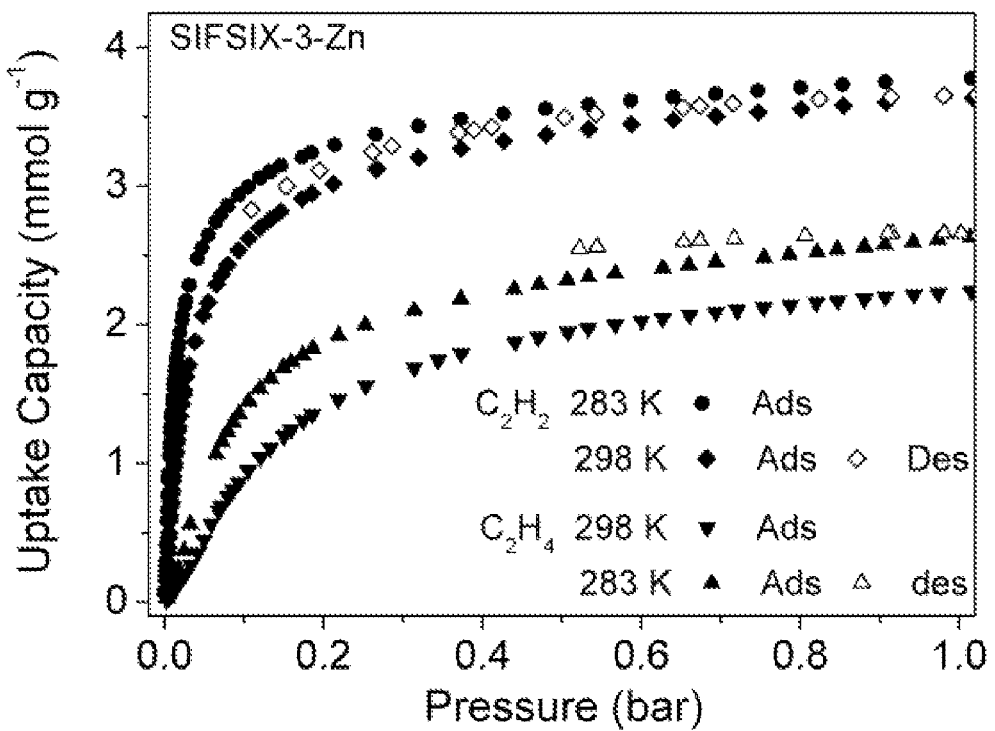

Pure Gas Sorption Studies of SIFSIX-3-Zn $C_2H_2$ and $C_2H_4$ sorption isotherms for SIFSIX-3-Zn were collected at 283 K and 398 K. As seen in FIG. 22A, SIFSIX-3-Zn uptakes 1.56 mmol/g and 3.6 mmol/g $C_2H_2$ at 0.025 and 1 bar, respectively. Under the same conditions, $C_2H_4$ uptakes of only 0.196 and 2.24 mmol/g were measured.

Figure 22B:
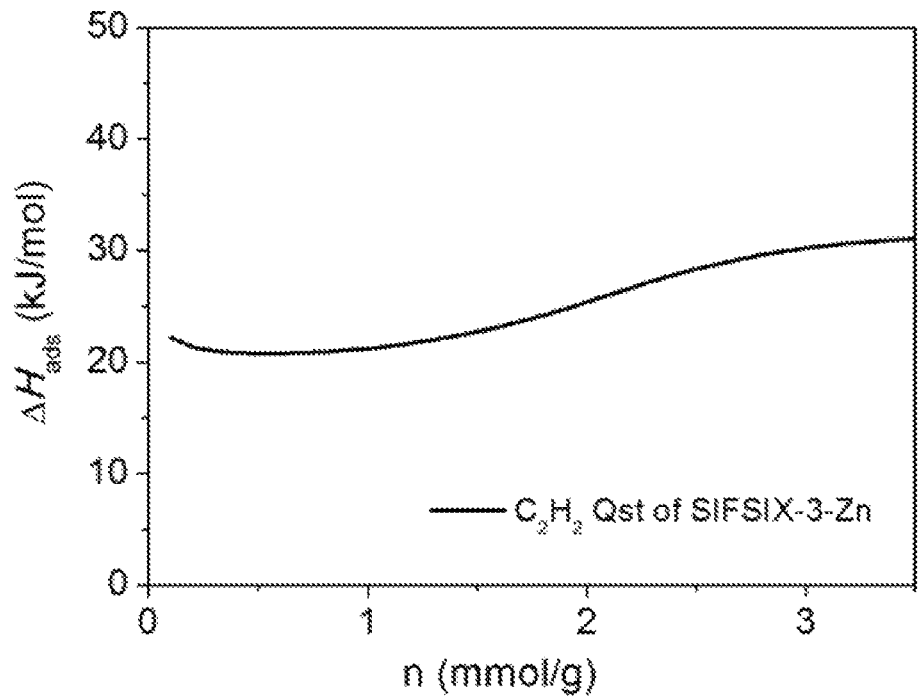

FIG. 22B shows $C_2H_2$ adsorption energy (Qst) of SIFSIX-3-Zn.

Powder X-Ray Diffraction (PXRD)

Figure 23:
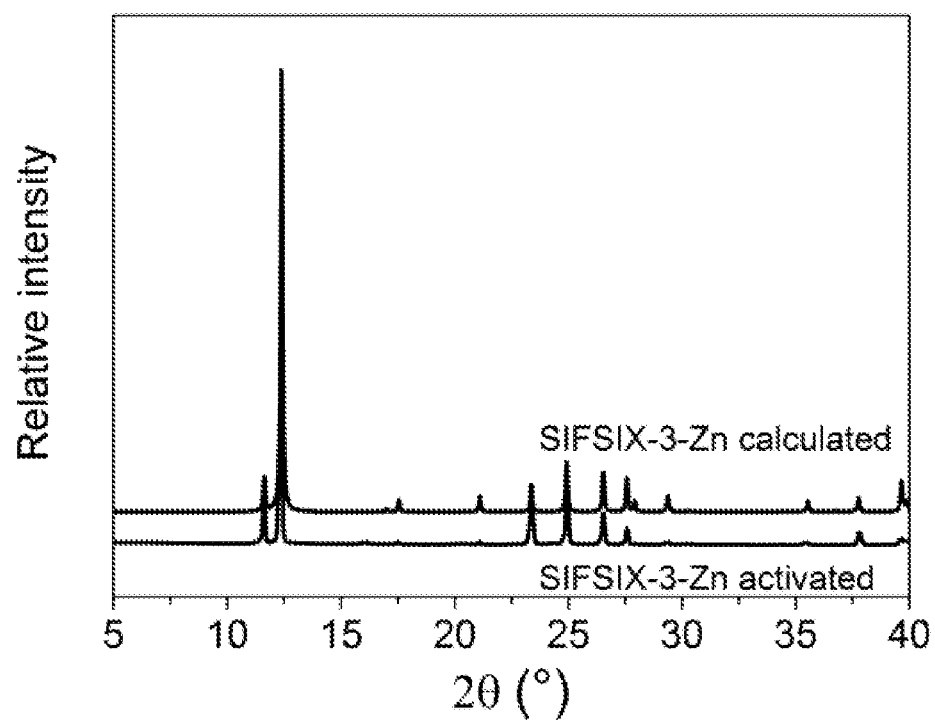

FIG. 23 shows PXRD patterns for SIFSIX-3-Zn.

EXAMPLE 8: BREAKTHROUGH TESTING ON GAS MIXTURES

Gases were purchased as certified mixtures of $C_2H_2$ and $C_2H_4$. For the purposes of this example, the term "GAS I" is used to denote a gas mixture composed of 1% $C_2H_2$ and 99% $C_2H_4$, whereas the term "GAS II" is used to denote a gas mixture composed of 50% $C_2H_2$ and 50% $C_2H_4$. Flow rate was monitored using a mass flow controller and held at 1.25 ml/min. Experiments were carried out at 25° C. Outlet from the column was monitored using gas chromatography (GC-8A, SHIMADZU) with an flame ionization detector (FID). The concentration of the certified mixtures was used to calibrate the concentration of the outlet gas.

All experiments were conducted using a stainless steel column (4.6 mm inner diameter×50 mm). According to the different particle size and density of the sample powder, the weight packed in the column was as follows: 0.23 g SIFSIX-1-Cu powder, 0.19 g SIFSIX-2-Cu-i and 0.78 g SIFSIX-3-

Figure 24A:
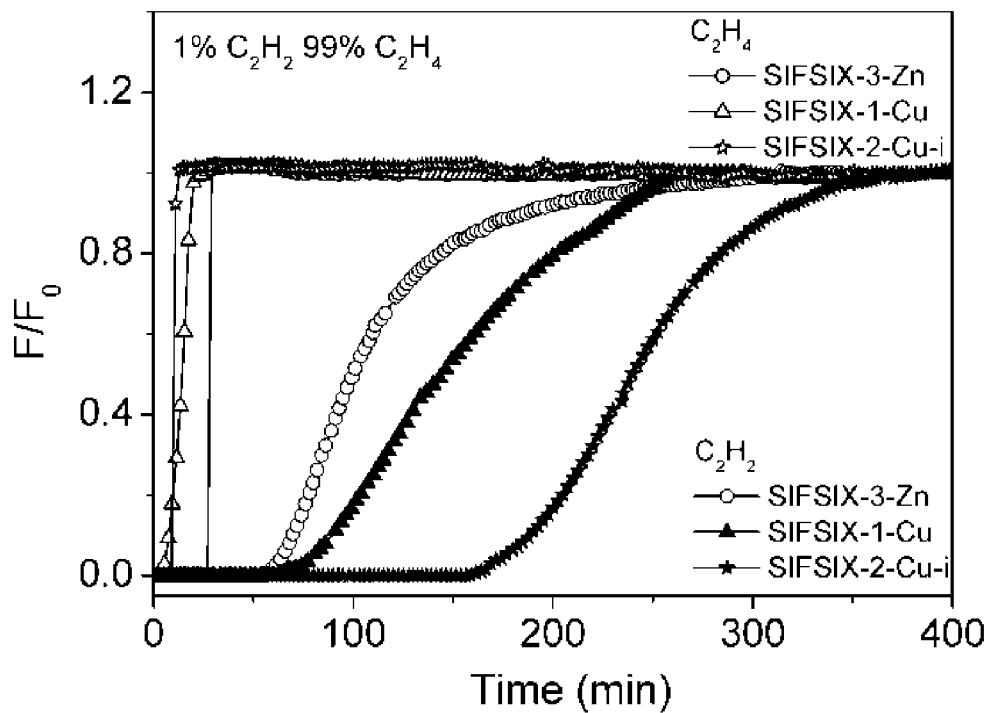
Figure 24B:
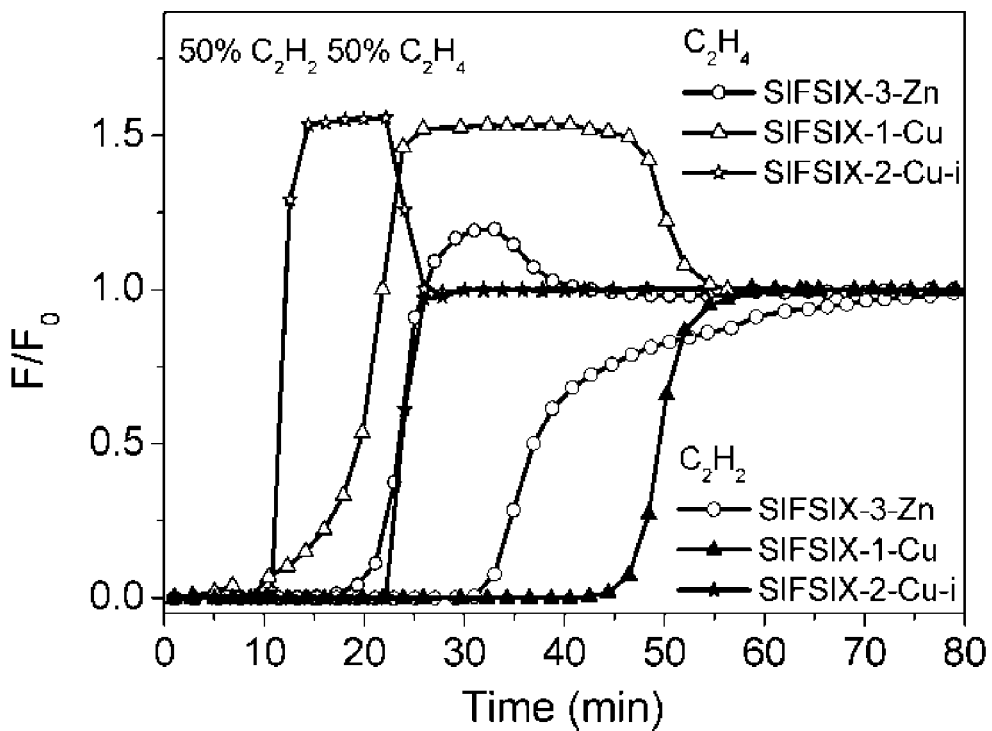

Zn, respectively. The sample was first purged with He flow (15 ml/min) for 12 h at room temperature (25° C.). The gas mixture (GAS II) flow was then introduced at 1.25 ml/min. After the breakthrough experiment, the sample was regenerated with He flow (15 ml/min) for about 20 hours. The breakthrough tests of GAS I were then conducted on the packed bed of SIFSIX-1-Cu, SIFSIX-2-Cu-i or SIFSIX-3-Zn at 25° C. The recorded breakthrough curves are shown in FIG. 24A and FIG. 24B. The x-axis is the ratio of acetylene in the gas eluted from the column to the fraction of acetylene in the starting gas (GAS I or GAS II) and the y-axis is time. These breakthrough tests measure how long it takes for ethylene and acetylene to pass through a column containing each porous material. The longer it takes for acetylene to pass through compared to ethylene, the better the separation.

FIG. 24A shows breakthrough curves of GAS I (1% $C_2H_2$ 99% $C_2H_4$) for SIFSIX-1-Cu, SIFSIX-2-Cu-i and SIFSIX-3-Zn. FIG. 24B shows breakthrough curves of GAS II (50% $C_2H_2$ 50% $C_2H_4$) for SIFSIX-1-Cu, SIFSIX-2-Cu-i and SIFSIX-3-Zn.

The breakthrough curves FIG. 24A and FIG. 24B show highly efficient separations were achieved for both 1/99 and 50/50 $C_2H_2/C_2H_4$. The hierarchy of breakthrough time for 1/99 mixture is SIFSIX-2-Cu-i>SIFSIX-1-Cu>SIFSIX-3-Zn, and for 50/50 mixture is SIFSIX-1-Cu>SIFSIX-3-Zn>SIFSIX-2-Cu-i. The amounts of $C_2H_2$ captured by SIFSIX-1-Cu, SIFSIX-2-Cu-i, and SIFSIX-3-Zn from the 50/50 $C_2H_2/C_2H_4$. (GAS II) mixture during the dynamic breakthrough process are 6.37, 2.88 and 1.52 mmol/g, respectively. These results demonstrate that the methods of the present invention using the hybrid porous materials described herein can provide a highly efficient and selective separation of acetylene from a gas mixture under ambient conditions.

EXAMPLE 9: BREAKTHROUGH TESTING ON GAS MIXTURES

Figure 25A:
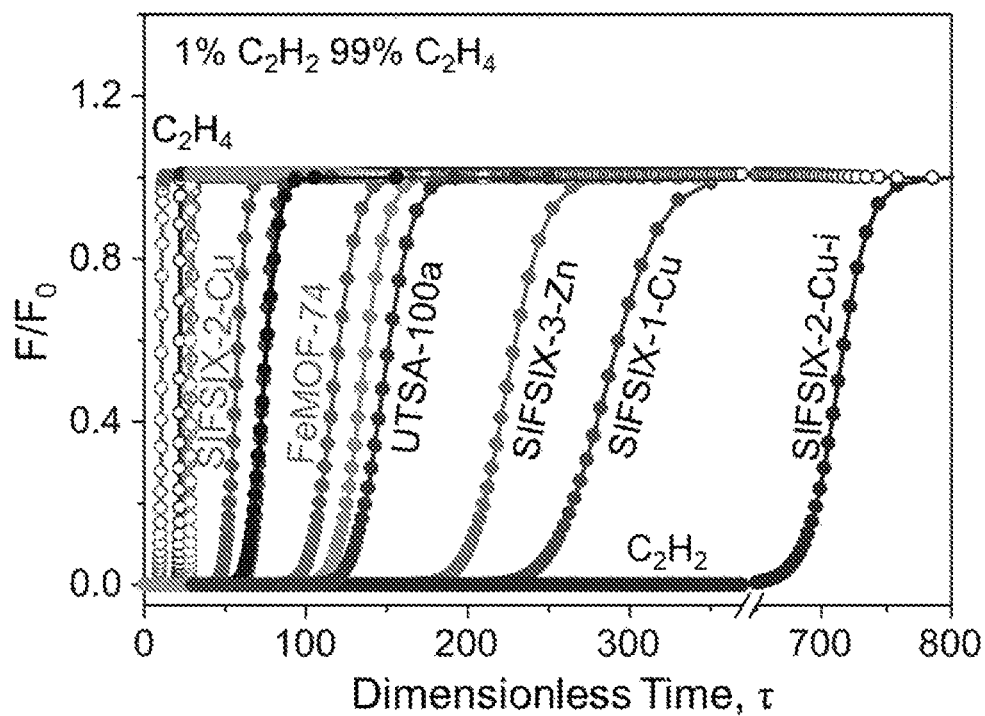

Breakthrough measurements were also carried out to compare the hybrid porous materials of the present invention with known benchmark materials (Fe-MOF-74 and UTSA-100a). As shown in FIG. 25A, SIFSIX-3-Zn, SIFSIX-1-Cu and SIFSIX-2-Cu-i are unexpectedly superior to all other materials.

Figure 25B:
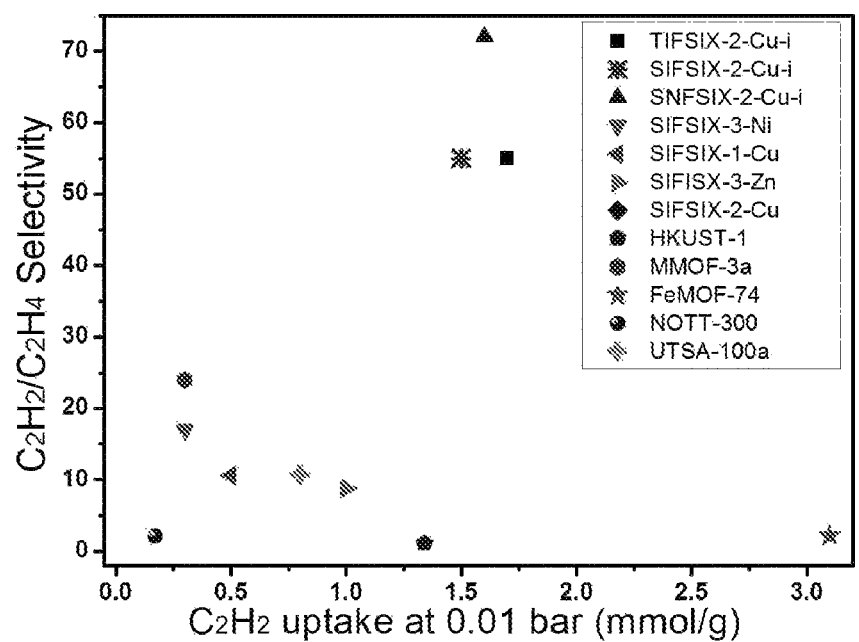

FIG. 25B is a plot of uptake vs. selectivity at low pressures of acetylene (0.01 atm). These conditions are relevant for trapping acetylene when acetylene is a minor component of a gas mixture (as is the case for purification of ethylene). The higher to the top right of the graph, the better the material. Three of the hybrid porous materials of the present invention demonstrate much higher selectivity than previously seen and they exhibit outstanding uptake. For example, Fe-MOF-74 has essentially no selectivity even though it has high uptake. This is because Fe-MOF-74 chemically bonds both ethylene and acetylene strongly (chemisorption) whereas our materials trap acetylene using physical forces (physisorption). To see such strong selectivity for physical forces is unprecedented and unexpected.

EXAMPLE 10: $C_2H_2/CO_2$ SEPARATION

Figure 26A:
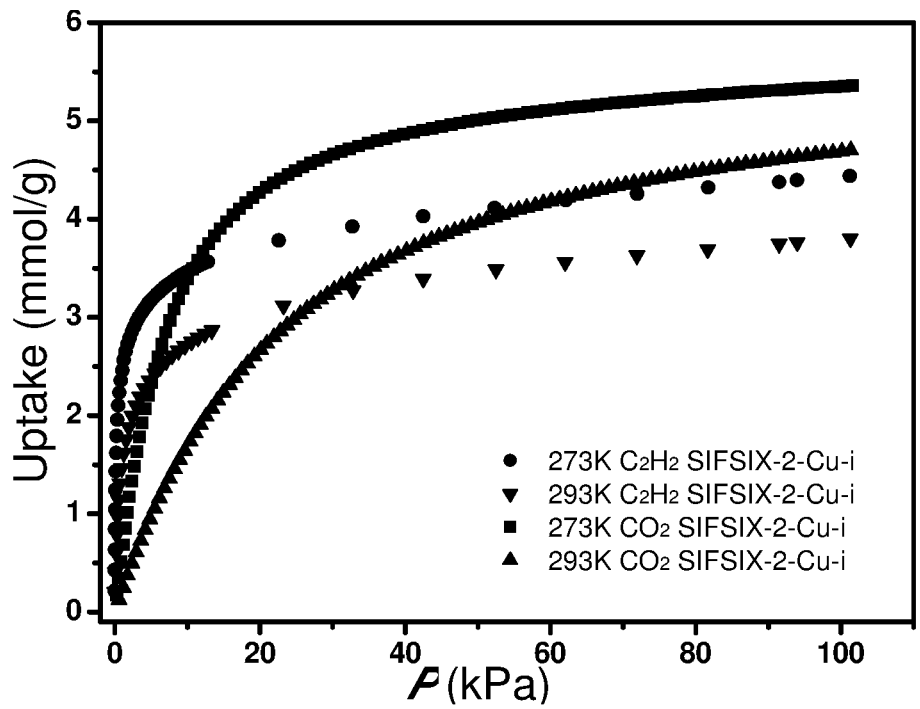
Figure 26B:
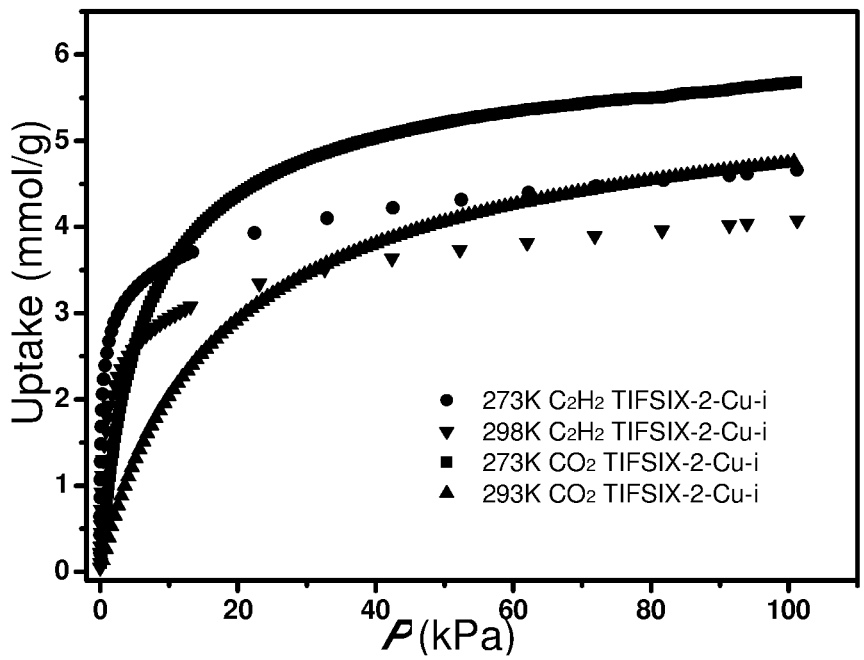
Figure 26C:
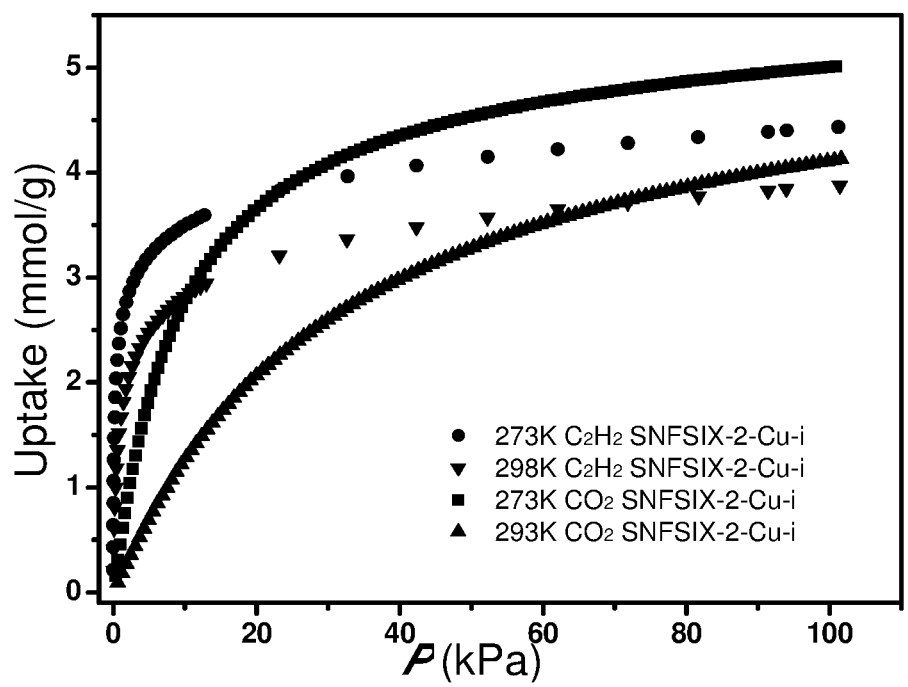
Figure 27:
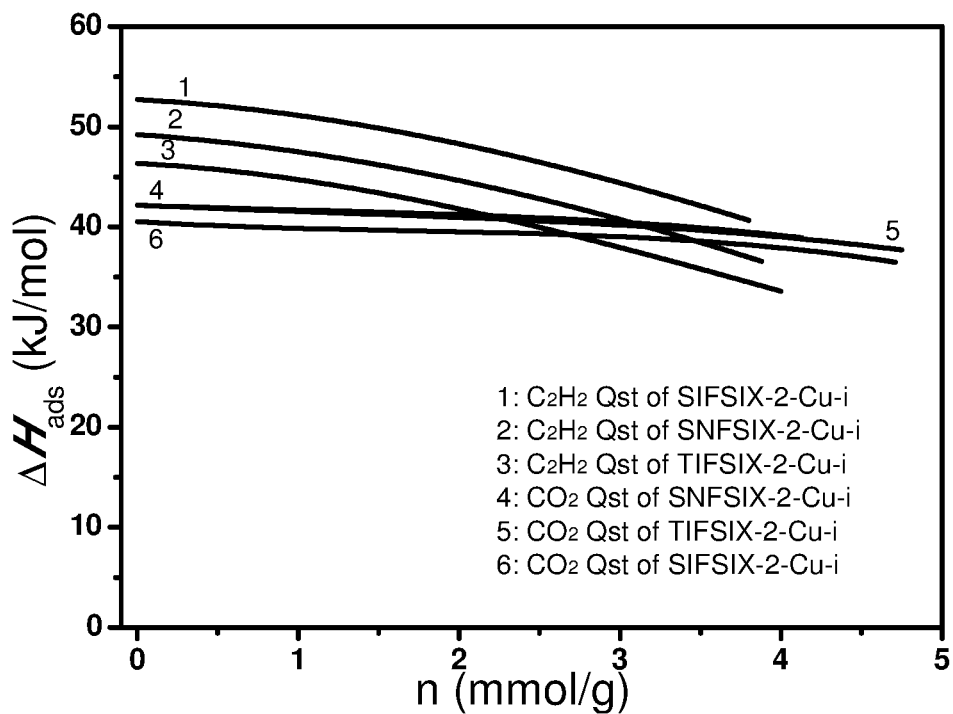
Figure 28:
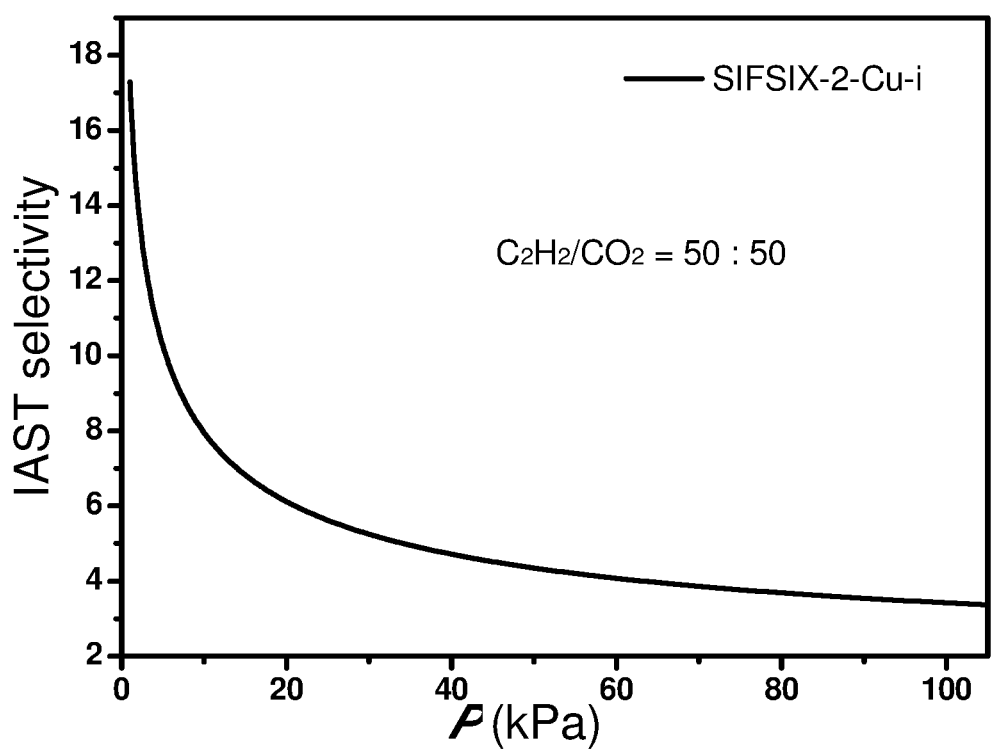

Remove $CO_2$ impurities from equimolar $C_2H_2/CO_2$ gas mixtures is an important industrial process for obtaining highly pure $C_2H_2$ as the starting material for many chemical products. Considering that the strict process pressure limit (below 2 bar) of pure $C_2H_2$ and the very similar chemical-physical properties of $C_2H_2$ and $CO_2$, this separation is considered to be more challenging than other separations such as $C_2H_2/C_2H_4$, $CO_2/CH_4$ and $CO_2/N_2$. FIGS. 26A, 26B, 26C show pure gas $C_2H_2$ and $CO_2$ sorption data of SIFSIX-2-Cu-i, TIFSIX-2-Cu-i and SNFSIX-2-Cu-i respectively. FIG. 27 shows adsorption energy (Qst) of SIFSIX-2-Cu-i, TIFSIX-2-Cu-i and SNFSIX-2-Cu-i and FIG. 28 shows IAST selectivity of SIFSIX-2-Cu-i, TIFSIX-2-Cu-i and SNFSIX-2-Cu-i.

$C_2H_2$ and $CO_2$ sorption isotherms for SIFSIX-2-Cu-i, TIFSIX-2-Cu-i and SNFSIX-2-Cu-i were collected at 273 and 298 K. As seen in FIGS. 26A-C, all three of these materials exhibit more uptake for $C_2H_2$ than $CO_2$ in the lower pressure region. At 273 K, uptakes for $C_2H_2$ of 2.9, 3.0 and 2.9 mmol/g were measured at 0.025 bar, for SIFSIX-2-Cu-i, TIFSIX-2-Cu-i and SNFSIX-2-Cu-i, respectively. Under the same conditions, $CO_2$ uptakes of only 1.4, 1.7 and 1.1 mmol/g were measured. By using the Clausius-Clapeyron equation, $C_2H_2$ isosteric heat at low loading of 52.7, 46.3 and 49.2 kJ/mol were obtained for SIFSIX-2-Cu-i, TIFSIX-2-Cu-i and SNFSIX-2-Cu-i, respectively, higher than the 40.5, 42.2 and 42.1 kJ/mol for $CO_2$. Based on the ideal adsorbed solution theory (IAST) calculation, the selectivity of SIFSIX-2-Cu-i for the equimolar mixture is c.a. 3 at 1 bar and 293 K, showing selective adsorption of $C_2H_2$ over $CO_2$.

In summary, the present invention provides a method of separating acetylene from a gas mixture comprising acetylene. The method involves the use of a hybrid porous material with an affinity for acetylene adsorption. The hybrid porous material comprises a three-dimensional structure of metal species (M) and first and second linker groups ($L^1$ and $L^2$), wherein the metal species (M) are linked together in a first and second direction by first linker groups ($L^1$) and are linked together in a third direction by second linker groups ($L^2$) to form the three-dimensional structure. The hybrid porous materials may have a high selectivity for acetylene and/or a high capacity for acetylene adsorption. The method may be particularly useful for the purification of ethylene gas contaminated with acetylene, for example during an ethylene production/purification process. The method may be particularly useful for the separation of acetylene from other gases such as ethylene and carbon dioxide, on a relatively large scale, for example during an acetylene production/purification process.

The invention claimed is:

1. A method of separating acetylene from a gas mixture comprising acetylene, the method comprising contacting the gas mixture with a hybrid porous material;
   wherein the hybrid porous material comprises a three-dimensional lattice of metal species (M) and linker groups;
   wherein the metal species (M) are linked together in a first dimension and a second dimension by first linker groups ($L^1$) and are linked together in a third dimension by a second linker groups ($L^2$) to form the three-dimensional lattice;
   wherein one of $L^1$ and $L^2$ is an organic linker group and the other of $L^1$ and $L^2$ is an inorganic linker group; and
   wherein the gas mixture is selected from a gas mixture comprising acetylene and ethylene, a gas mixture comprising acetylene and carbon dioxide, and a gas mixture comprising acetylene, ethylene, and carbon dioxide.

2. The method according to claim 1, wherein the hybrid porous material has the chemical formula: $M(L^1)_2(L^2)$.

3. The method according to claim 1, wherein the three-dimensional lattice of metal species (M) and linker groups ($L^1$ and $L^2$) comprises the repeating structural unit (I):

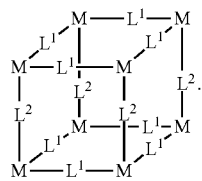
(I)

4. The method according to claim 1, wherein the metal species (M) are selected from atoms or ions of Cu, Zn and Ni.

5. The method according to claim 1, wherein the first linker groups ($L^1$) are organic linkers.

6. The method according to claim 5, wherein the first linker groups ($L^1$) are two-connected nitrogen ligands.

7. The method according to claim 6, wherein the first linker groups ($L^1$) are two-connected nitrogen ligands selected from pyrazine, 4,4'-bipyridine and 4,4'-bipyridylacetylene.

8. The method according to claim 1, wherein the second linker groups ($L^2$) comprise at least one fluorine atom.

9. The method according to claim 1, wherein the second linker groups ($L^2$) are compounds of formula $AX_n^{y-}$, wherein X is selected from F or Cl, n is an integer from 2 to 6, y is an integer from 0 to 2 and A is selected from Si, Ti, Sn, Zr or Ge.

10. The method according to claim 1, wherein the metal species (M) are selected from $Cu^{2+}$, $Ni^{2+}$ and $Zn^{2+}$ ions, the first linker groups ($L^1$) are selected from 4,4'-bipyridylacetylene, 4,4'-bipyridine and pyrazine and the second liker groups ($L^2$) are selected from $SiF_6^{2-}$, $TiF_6^{2-}$ and $SnF_6^{2-}$ ions.

11. The method according to claim 1, wherein the hybrid porous material comprises pores with an effective pore size of from 3.5 to 12 Å.

12. The method according to claim 1, wherein the gas mixture comprises a ratio of acetylene:ethylene of from 0.1:99.9 to 10:90.

13. The method according to claim 1, wherein the gas mixture comprises a ratio of acetylene:ethylene of from 4:6 to 9:1.

14. The method according to claim 1, wherein the contacting of the gas mixture with the hybrid porous material is carried out at a temperature of from −20° C. to 60° C.

15. The method according to claim 1, wherein the contacting of the gas mixture with the hybrid porous material is carried out at a pressure of from 0.5 to 2 bar.

* * * * *